United States Patent
Watarai

(10) Patent No.: US 8,369,613 B2
(45) Date of Patent: Feb. 5, 2013

(54) IMAGE PROCESSING CIRCUIT, IMAGE PROCESSING METHOD, AND CAMERA

(75) Inventor: Yuji Watarai, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 891 days.

(21) Appl. No.: 12/364,163

(22) Filed: Feb. 2, 2009

(65) Prior Publication Data

US 2009/0202168 A1     Aug. 13, 2009

(30) Foreign Application Priority Data

Feb. 9, 2008   (JP) ................... 2008-29812

(51) Int. Cl.
*G06K 9/40* (2006.01)
*H04N 5/217* (2011.01)

(52) U.S. Cl. .................. 382/162; 382/261; 348/241

(58) Field of Classification Search .............. 382/162, 382/260, 261, 262, 263, 264; 348/241
See application file for complete search history.

(56) References Cited

U.S. PATENT DOCUMENTS

| | | | | |
|---|---|---|---|---|
| 5,293,481 A | * | 3/1994 | Mita et al. | 345/505 |
| 5,740,340 A | * | 4/1998 | Purcell et al. | 345/418 |
| 6,496,192 B1 | | 12/2002 | Shreesha et al. | |
| 2002/0093510 A1 | | 7/2002 | Abe | |
| 2007/0133871 A1 | * | 6/2007 | Yoshiura | 382/167 |
| 2007/0242875 A1 | | 10/2007 | Tanaka et al. | |

FOREIGN PATENT DOCUMENTS

| | | |
|---|---|---|
| JP | 2002-218482 A | 2/2000 |
| JP | 2001-117555 | 4/2001 |
| JP | 2001-218114 | 8/2001 |
| JP | 2002-101426 A | 4/2002 |
| JP | 2006-332732 A | 12/2006 |
| JP | 2007-288439 A | 11/2007 |
| WO | WO 2007/064119 A1 | 6/2007 |

OTHER PUBLICATIONS

Japanese Office Action from JP App. No. 2008-029812 dated on Nov. 15, 2011.

Japanese Office Action, Notification of Reasons for Refusal, dated May 29, 2012, 6 pages.

* cited by examiner

*Primary Examiner* — Jon Chang

(74) *Attorney, Agent, or Firm* — Arent Fox LLP

(57) ABSTRACT

An image processing circuit includes a memory configured to store an image retrieved from an image pick-up element, wherein the image is written on a plurality of rows of a two dimensional storage area of the memory and a filtering circuit configured to perform a filtering process with respect to each pixel data on a row when the image is written on the plurality of rows of the two-dimensional storage area of the memory.

9 Claims, 18 Drawing Sheets

FIG. 2A
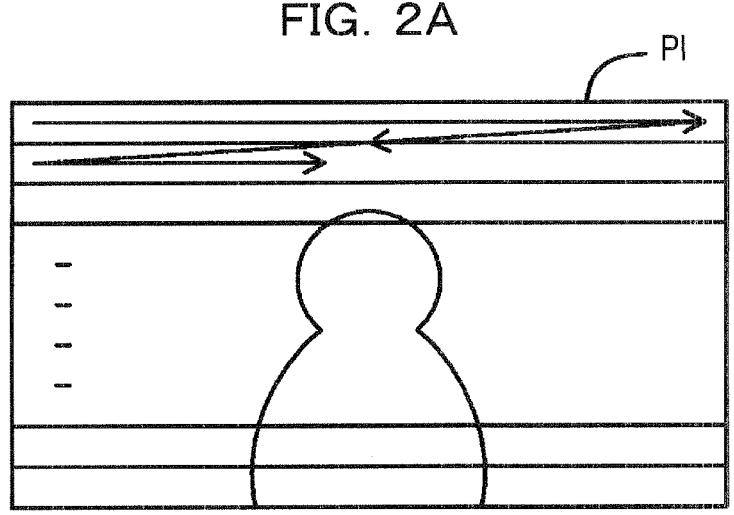
TRANSFERRING
FIG. 2B
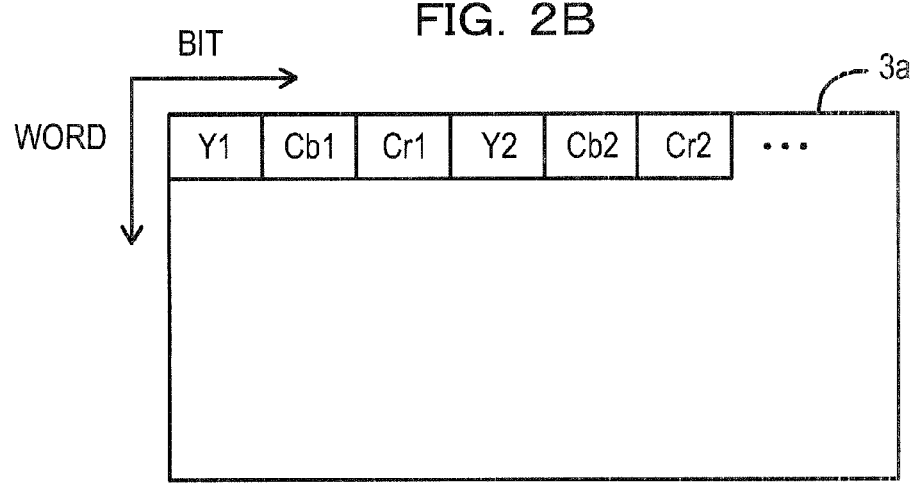

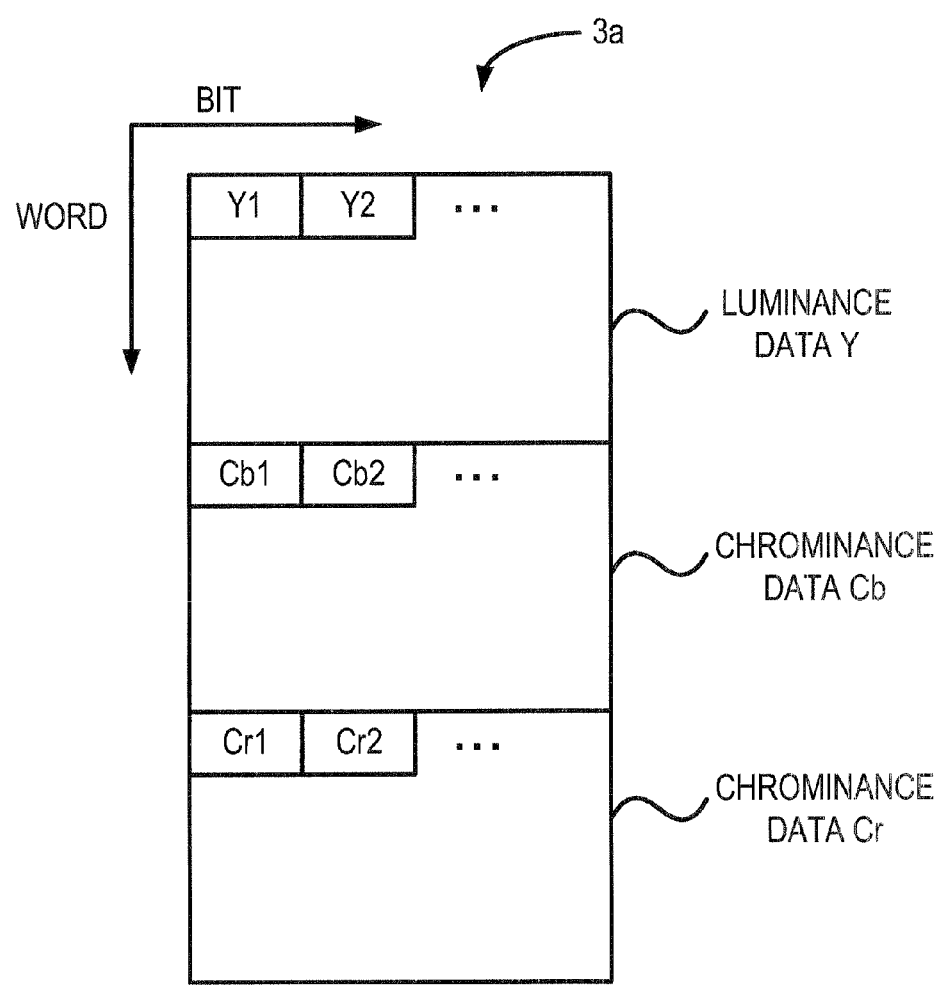

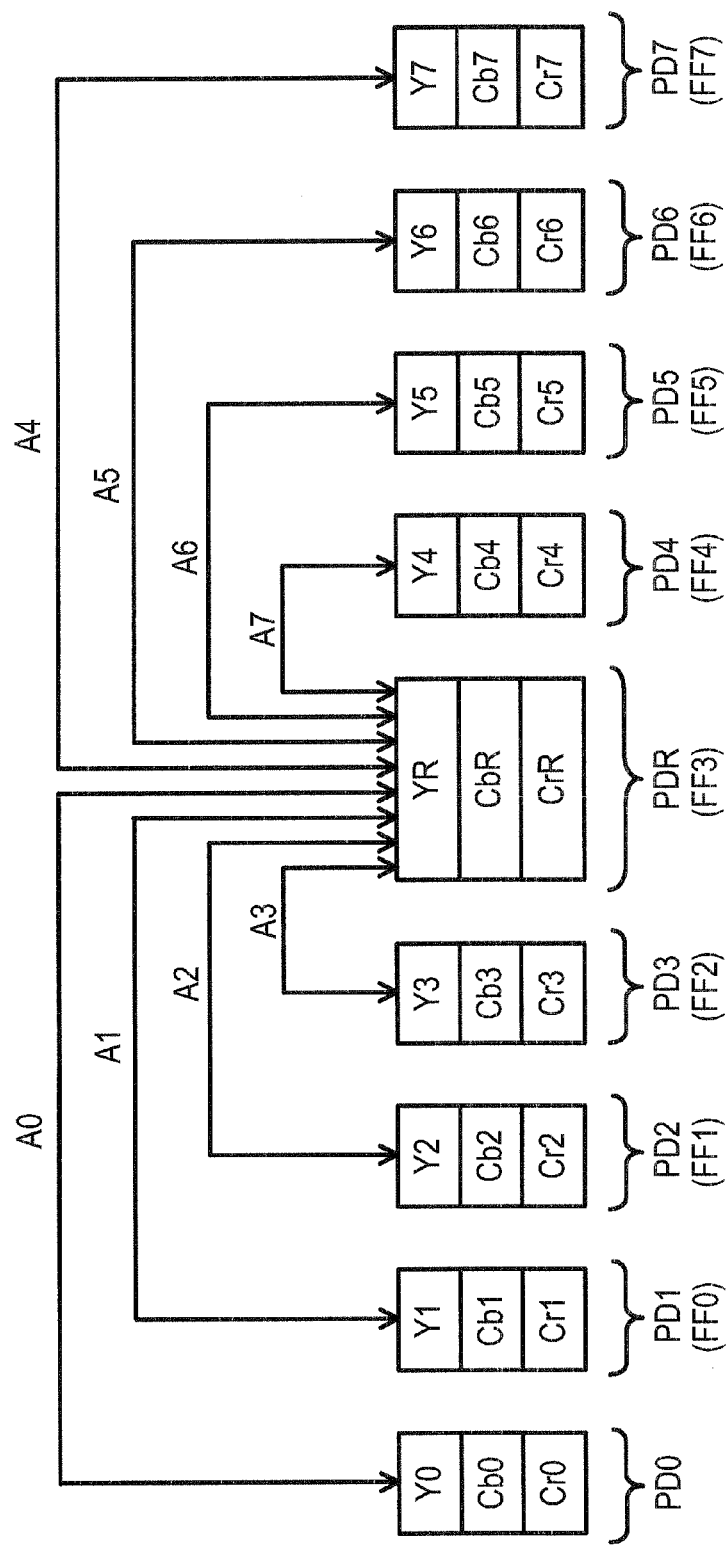

90-DEGREE POTATION

90-DEGREE POTATION

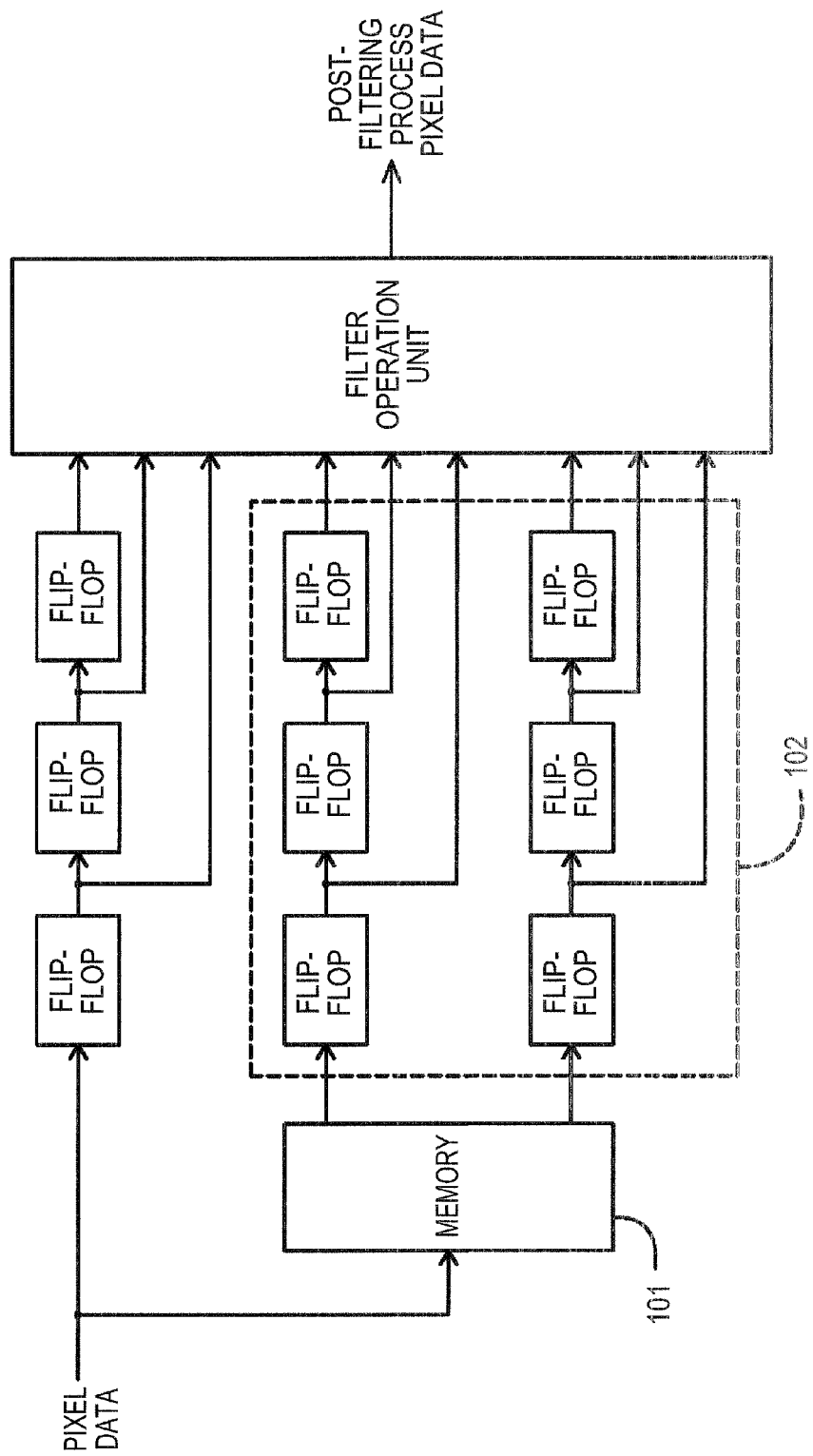

IMAGE PROCESSING CIRCUIT, IMAGE PROCESSING METHOD, AND CAMERA

CROSS-REFERENCE TO RELATED APPLICATIONS

This application is based upon and claims the benefit of priority of the prior Japanese Patent Application No. 2008-029812, filed on Feb. 9, 2008, the entire contents of which are incorporated herein by reference.

FIELD

The embodiments discussed herein are related to an image processing circuit for image data.

BACKGROUND

A filtering circuit 100 illustrated in FIG. 18 is an example of a hardware configuration by which a filtering process for noise reduction is performed. As depicted in FIG. 18, the filtering circuit 100 has a hardware configuration for a 3×3 spatial filter. The 3×3 spatial filter includes pixel data for 3 pixels in a horizontal direction and 3 pixels in a vertical direction. The pixel data in the vertical direction is referenced by the hardware configuration when the filtering process of the 3×3 spatial filter is used with the hardware configuration. For this reason, the hardware configuration requires a memory 101 and a flip-flop 102 for storing the pixel data equivalent to 2 lines.

An image retrieved by an image pick-up element may contain a low-frequency noise with a low frequency spatial distribution. One an example of a low-frequency noise includes a stripe-like noise ranging over a wide range equal to or greater than 5 pixels. Since the low-frequency noise has a characteristic of low frequency and spans a wide range, it is difficult to remove such noise by known spatial filters, such as, 3×3 pixels or 5×5 pixels. Conversely, if a large-scale spatial filter, such as, 21×21 pixels were to be used for removal of the noise spanning the wide range, such large-scale spatial filters require a larger circuit-scale for a memory, storing pixel data in the vertical direction, and a filter operation unit or the like, and thus have also been problematic.

SUMMARY

According to an aspect of the invention, an image processing circuit includes a memory configured to store an image retrieved from an image pick-up element, wherein the image is written on a plurality of rows of a two dimensional storage area of the memory and a filtering circuit configured to perform a filtering process with respect to each pixel data on a row when the image is written on the plurality of rows of the two-dimensional storage area of the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A illustrates an image PI.
FIG. 2B illustrates a method of storing the image PI from FIG. 2A in a two-dimensional storage area 3a.
FIG. 3 illustrates a storing method based upon a field-sequential method.
FIG. 7 illustrates an explanation of an operation of a filtering circuit.
FIG. 13 illustrates an internal circuit of a judgment selection circuit SC0a.
FIG. 18 illustrates a circuit of a filtering circuit 100.

DESCRIPTION OF EMBODIMENTS

Figure 1:
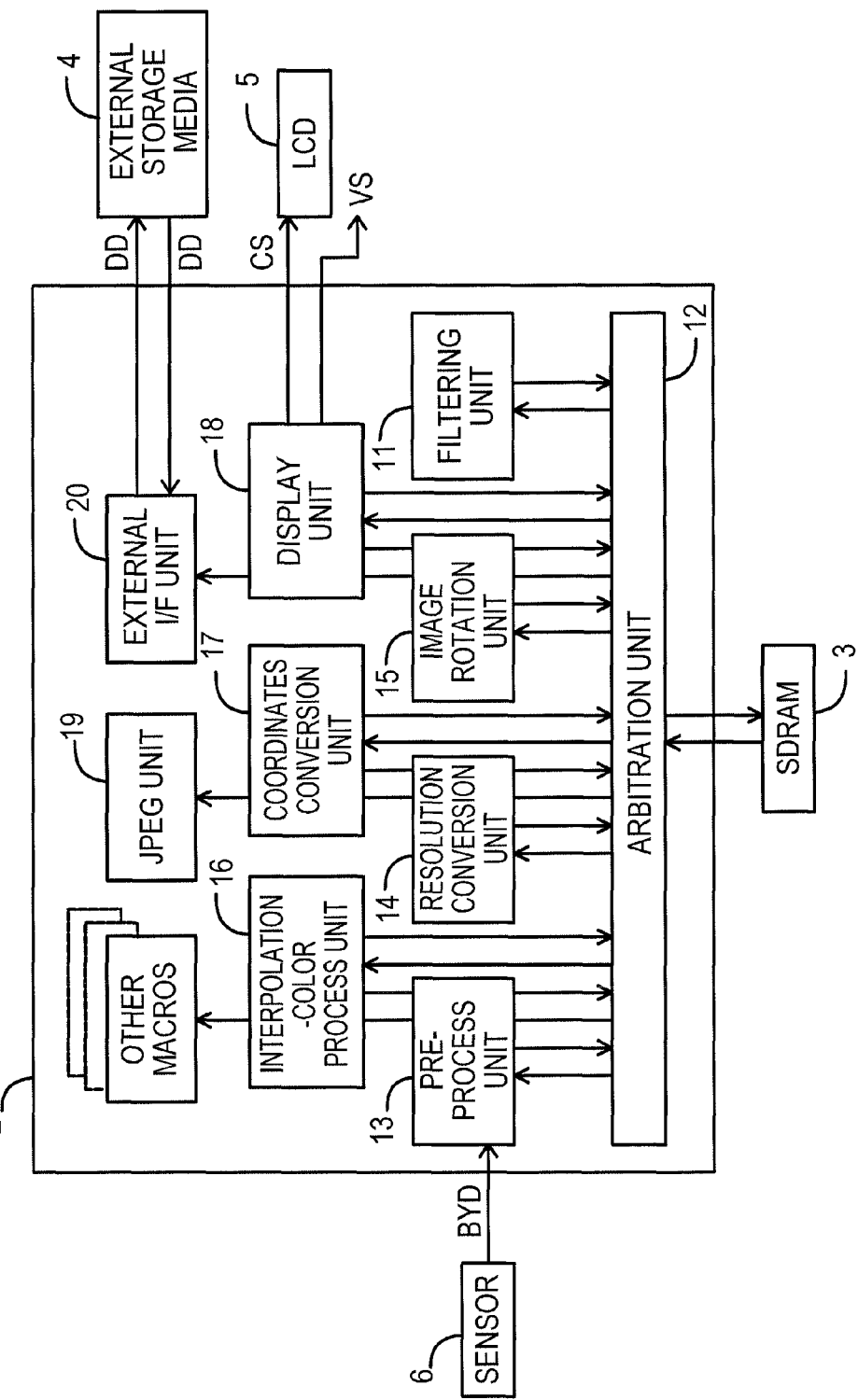
FIG. 1 illustrates a camera according to a first embodiment.

Hereinafter, detailed descriptions of embodiments for an image processing circuit, an image processing method, and a camera disclosed hereby will be provided with reference to drawings from FIG. 1 to FIG. 18. A first embodiment will be disclosed with reference to FIGS. 1 to 7. FIG. 1 illustrates a camera 1 according to the first embodiment.

The camera 1 includes an image processing circuit 2, an SDRAM 3, an external storage media 4, an LCD 5, and a sensor 6. A sensor 6 is an image sensor that converts an image, received via a lens, into digital signals arranged in a two-dimension array and outputs the digital signals. Sensor 6 comprises a CCD sensor, a CMOS sensor or the. An SDRAM 3 is a large-capacity temporal storage memory. An external storage media 4 is a media that store image data, and a flash memory, a smart media, an SD card or the like may be pointed out, as examples thereof. An LCD 5 is a liquid crystal display panel.

The image processing circuit 2 is provided with a variety of macros made up of hardware. In one implementation, Bayer matrix data BYD is applied to pre-process unit 13 from sensor 6. The pre-process unit 13 performs a data rearrangement operation on the Bayer matrix data BYD and carries out an operation of detecting information on an input image, such as, exposure, a white balance, and a focus. An interpolation-color process unit 16 carries out a variety of processes, such as, color conversion, contour emphasis, and gamma correction. Furthermore, the interpolation-color process unit 16 carries out an operation of converting the Bayer matrix data BYD a format such as, "R, G, B" format data, "Y, Cb, Cr" format data, or the like.

Hereinafter, a "Y, Cb, Cr" format will be explained. The "Y, Cb, Cr" format is a format in which a pixel is divided into luminance information (Y) and chrominance information (Cb and Cr). A human eyes resolution for recognizing a difference in color (chrominance) is low in comparison with recognizing variations in brightness (luminance). For this reason, a reduction in the chrominance information relative to the luminance information allows for a reduction in an image size. The first embodiment discloses use of a "Y, Cb, Cr, 4:4:4" format. In the "Y, Cb, Cr, 4:4:4" format, a piece of luminance data Y, a piece of chrominance data Cb, and a piece of chrominance data Cr corresponds to one (1) pixel.

An arbitration unit 12 adjusts reading and writing of the image data between respective macros and the SDRAM 3. Hereinafter, with reference to FIGS. 2A and 2B, an implementation of a point-sequential method of storing an image PI, as depicted in FIG. 2A, equivalent to one (1) frame in the "Y, Cb, Cr" format, in the two-dimensional storage area 3a of the SDRAM 3, as depicted in FIG. 2B, is disclosed. It should be noted that use of language such as upper, lower, left, right, horizontal, vertical and the like is meant to provide clarity is presentation of exemplary implementations, and is not meant to limit the scope of the present invention. First, the arbitration unit 12 transfers the pixel data on an uppermost row of the image PI, equivalent to one (1) frame, to the SDRAM 3. An image data transfer is performed in a row direction (horizontal direction) from a top-left position. Second, the arbitration unit 12 sequentially transfers the pixel data on a row-by-row basis in descending order from the uppermost row. Third, the pixel data transferred from the arbitration unit 12 is stored in two-dimensional storage area 3a in a manner giving priority to row direction. Note that, in the same manner as disclosed above, the pixel data is read in a manner giving priority to row direction, and the pixel data is transferred to the arbitration unit 12 when the image PI is read from the two-dimensional storage area 3a of the SDRAM 3 to be transferred to the arbitration unit 12.

That is to say, with respect to the image PI, the pixel data retrieved in a manner giving priority to row direction is stored in two-dimensional storage area 3a in a manner giving priority to row direction. Additionally, the pixel data is read from two-dimensional storage area 3a in a manner giving priority to row direction.

Note that FIG. 3 illustrates a diagram for a storing method according to a field-sequential method. In the illustrated field-sequential method, an area is separated according to components, such as, the luminance data Y, the chrominance data Cb, and the chrominance data Cr, and the pixel data is stored in the two-dimensional storage area 3a with respect to each component. Note that, in the field-sequential method, the pixel data is read from/written to the two-dimensional storage area 3a in a manner giving priority to the row direction. For this reason, the order of pixel data arrangement is the same as that according to the point-sequential method disclosed above.

Pixel data PD0 is applied to a filtering unit 11 from the arbitration unit 12. The pixel data PD0 includes luminance data Y0 and chrominance data Cb0 and Cr0. The filtering unit 11 outputs post-process pixel data PDF0. The post-process pixel data PDF0 includes post-process chrominance data CbF0 and CrF0.

In one implementation, an image rotation unit 15 performs a 90-degree rotation, a 180-degree rotation, a vertical inversion, a horizontal inversion or the like of an image. A coordinates conversion unit 17 performs a coordinates conversion of the image to perform an operation of converting any polygonal area into a polygonal area having different shape or the like. A resolution conversion unit 14 enlarges and reduces the image.

JPEG unit 19 performs encoding/decoding of the image data into/from JPEG format. External I/F unit 20 is capable of reading and writing data DD from and to the external storage media 4. A display unit 18 converts/outputs signals, such as, a signal CS for the LCD 5 and a video signal VS, which corresponds to an external display device.

Figure 4:
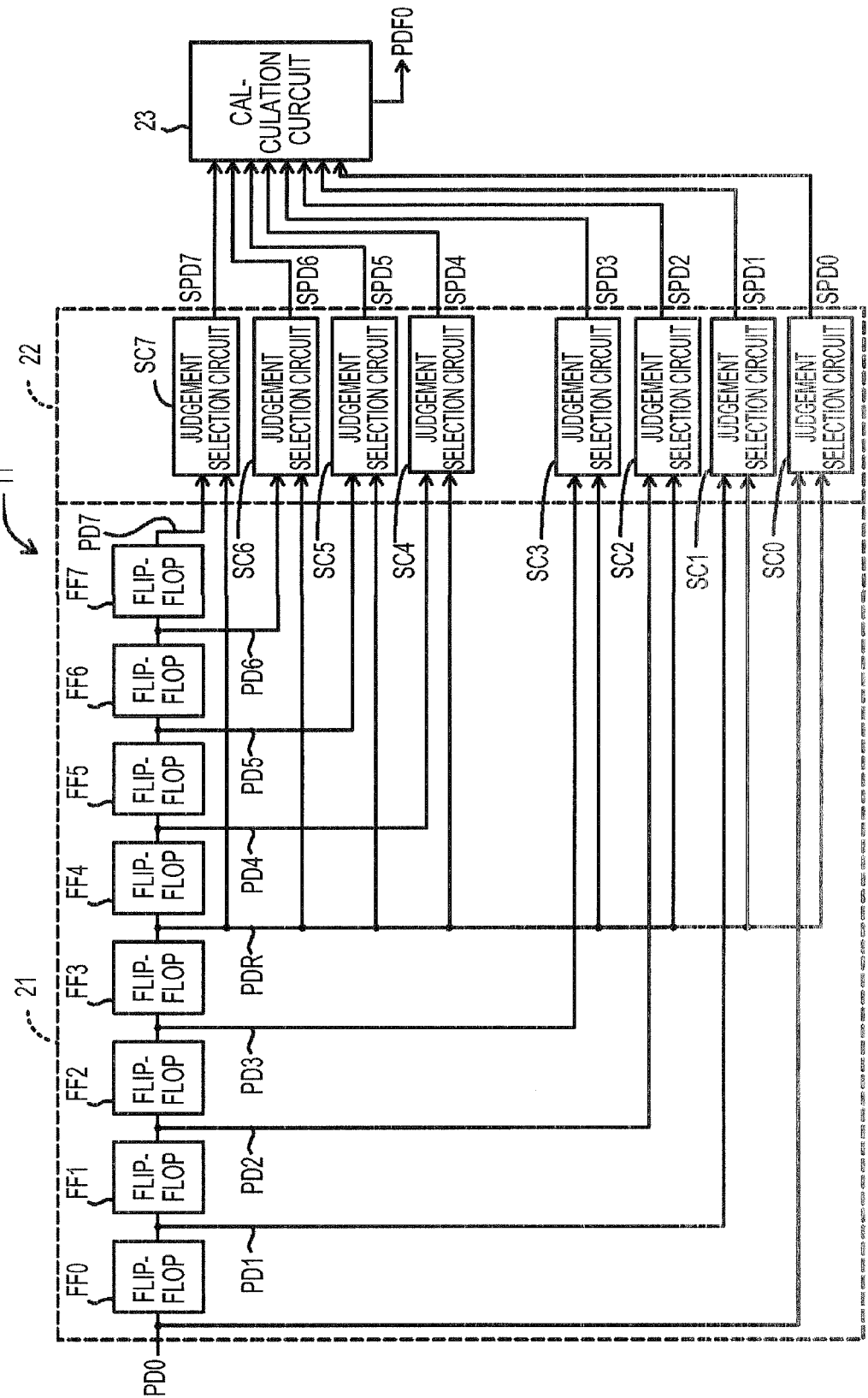
FIG. 4 illustrates an internal circuit of a filtering unit 11.

FIG. 4 illustrates an internal circuit of the filtering unit 11. As depicted in FIG. 4, the filtering unit 11 includes a line memory unit 21, a selection unit 22, and a calculation circuit 23. The line memory unit 21 includes flip-flops FF0 to FF7. The flip-flops FF0 to FF7 are coupled in series with each other so that an output of one flop-flop provided on a certain stage may be applied to another flip-flop provided on the following stage. The pixel data PD0 (luminance data Y0, and chrominance data Cb0 and Cr0) from the arbitration unit 12 is applied to the flip-flop FF0. Pixel data PD1 (luminance data Y1, and chrominance data Cb1 and Cr1) is retrieved from the flip-flop FF0 and applied to the flip-flop FF1. Pixel data PD2 (luminance data Y2, and chrominance data Cb2 and Cr2) is retrieved from the flip-flop FF1 and applied to the flip-flop FF2. In the same manner, pixel data PD3 is retrieved from the flip-flop FF2. The flip-flop FF3 outputs target pixel data PDR (target pixel luminance data YR, and target pixel chrominance data CbR and CrR). Pixel data PD4 to PD7 are retrieved from the flip-flops FF4 to FF7, respectively.

As depicted in FIG. 4, selection unit 22 includes judgment selection circuits SC0 to SC7. The pixel data PD0 and the target pixel data PDR are applied to the judgment selection circuit SC0, and selective chrominance data SPD0 (selective chrominance data SCb0 and SCr0) is retrieved. In the same manner, each of the pixel data PD1 to PD7 and the target pixel data PDR are applied to each of the judgment selection circuits SC1 to SC7. Then each of selective chrominance data SPD1 to SPD7 are retrieved from each of the judgment selection circuits SC1 to SC7. The selective chrominance data SPD0 to SPD7 are applied to the calculation circuit 23. Then the post-process pixel data PDF0 (post-process chrominance data CbF0 and CrF0) is retrieved from the calculation circuit 23.

Figure 5:
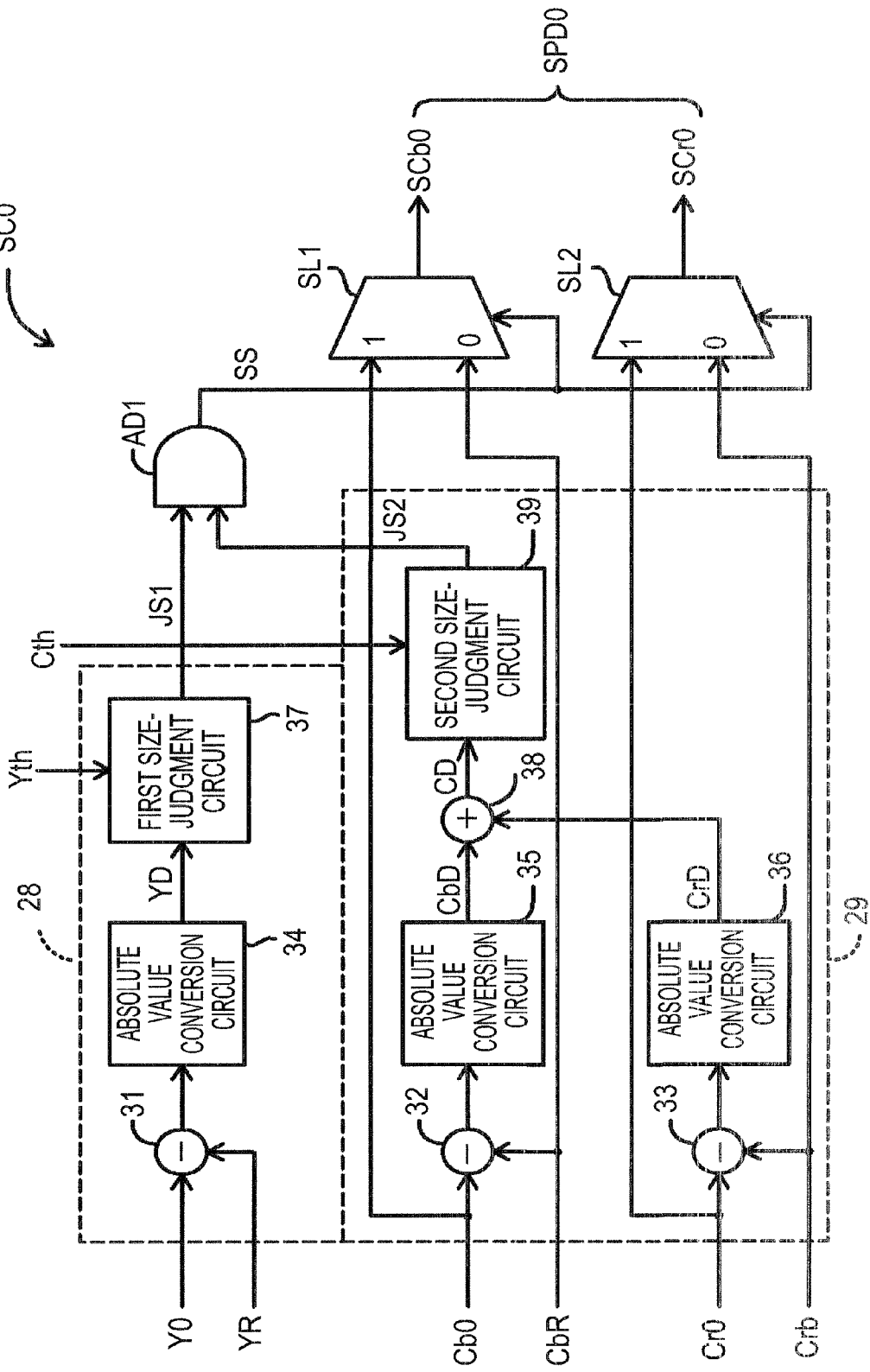
FIG. 5 illustrates an internal circuit of a judgment selection circuit SC0.

FIG. 5 illustrates an internal circuit of the judgment selection circuit SC0. As depicted in FIG. 5, judgment selection circuit SC0 includes a luminance data judgment unit 28, a chrominance data judgment unit 29, an AND circuit AD1, and selectors SL1 and SL2. In response to the luminance data Y0 being applied to subtraction circuit 31 of the luminance data judgment unit 28 from the arbitration unit 12, the target pixel luminance data YR is applied to the subtraction circuit 31 from the flip-flop FF3. A calculation result from the subtraction circuit is applied to an absolute value conversion circuit 34, and a Y-difference YD is determined. The Y-difference YD and a luminance threshold value Yth are applied to a first size-judgment circuit 37, and a judgment signal JS1 is determined. Note that the luminance threshold value Yth is a value that may be freely set by users, or the like.

The chrominance data Cb0 and the target pixel chrominance data CbR are applied to a subtraction circuit 32 of the chrominance data judgment unit 29. A calculation result from the subtraction circuit 32 is applied to an absolute value conversion circuit 35, and a Cb-difference CbD is determined. In the same manner, the chrominance data Cr0 and the target pixel chrominance data CrR are applied to a subtraction circuit 33.

A calculation result from the subtraction circuit 33 is applied to an absolute value conversion circuit 36, and a Cr-difference CrD is determined. The Cb-difference CbD and the Cr-difference CrD are applied to an addition circuit 38, and Cb-Cr-difference CD is determined. The Cb-Cr-difference CD and a chrominance threshold value Cth are applied to a second size-judgment circuit 39, and a judgment signal JS2 is determined. Note that the chrominance threshold value Cth is a value that may be freely set by a user or the like.

The judgment signals JS1 and JS2 are applied to the AND circuit AD1, and a selector signal SS is determined. The chrominance data Cb0, the target pixel chrominance data CrR, and the selector signal SS are applied to the selector SL1, and the selective chrominance data SCb0 is determined. In the same manner as the chrominance data Cr0, the target pixel chrominance data CrR, and the selector signal SS are applied to the selector SL2, and the selective chrominance data SCr0 is determined. Selective chrominance data SPD0 is made up of the selective chrominance data SCb0 and SCr0. Note that since structures of the judgment selection circuits SC1 to SC7 are substantially the same as that of the judgment selection circuit SC0, detailed descriptions thereof is reduced or omitted.

An operation of the filtering unit 11 in one implementation will now be discussed. The filtering unit 11 is a type of filter that removes low-frequency color noises. The low-frequency noise has a characteristic of a low spatial distribution frequency, for example, a stripe-like noise, ranging over a wide area equal to or greater than 5 pixels, or the like. Furthermore, the color noise has another characteristic where although an image is originally even, the image may be seen as if it were mottled with a blue component and a red component.

Examples of a variety filtering process performed by the filtering unit 11 includes filtering processes, such as, an epsilon filtering process, a low-pass filtering process, a median filtering process or the like. The first embodiment discloses a case where the epsilon filtering process is carried out.

An epsilon filter may be used for the purpose of removing small-amplitude noises. That is to say, the epsilon filter performs selective smoothing by use of a pixel value of a target pixel at the center and data points that fall within a range of ± (plus or minus) epsilon ($\epsilon$). The epsilon filter is defined by the following Equation (1) in a case of one-dimension.

$$y(n) = x(n) - \sum_{k=-N}^{N} a_k f\{x(n) - x(n-k)\} \quad \text{Equation (1)}$$

Here, y(n) represents an output signal value of the epsilon filter, and x(n) represents an input signal value. A coefficient $a_k$ represents a constant, which determines a mask size of the epsilon filter and a weighting with respect to each pixel, and in other words, the coefficient, which satisfies Equation (2).

$$\sum_{k=-N}^{N} a_k = 1 \quad \text{Equation (2)}$$

A function f(x) is a nonlinear function where an absolute value of the function satisfies |f(x)| is less than or equal to ($\leq$) $\epsilon$. In addition, the function f(x) may be represented by Equation (3). Here, $\beta$ is a constant.

$$f(x)=x(x \leq \epsilon), f(x)=\beta(x > \epsilon) \quad \text{Equation (3)}$$

Figure 6:
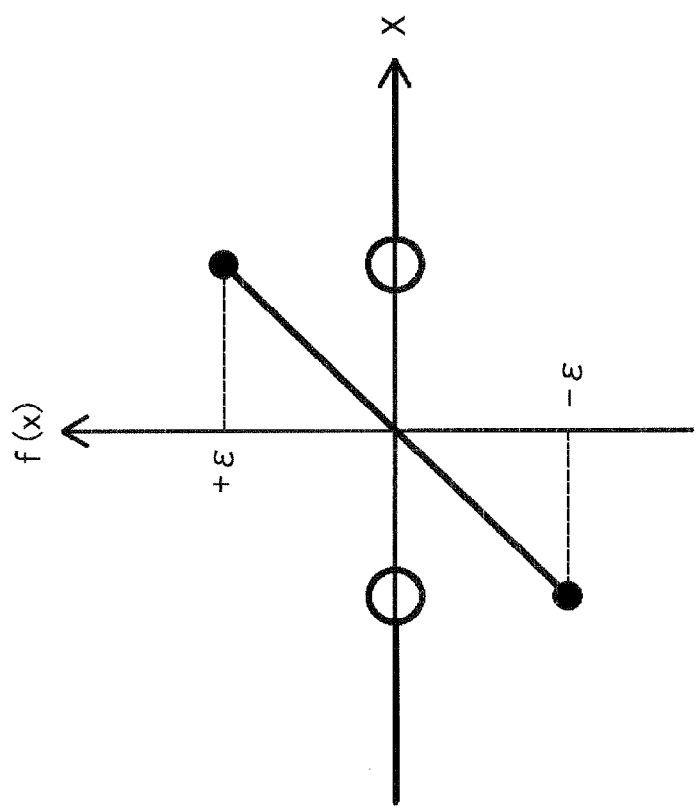
FIG. 6 illustrates a graph (1) indicating a filter function.

If $\beta$=(is equal to) 0 in Equation (3), Equation (3) becomes a filter function represented by FIG. 6. In the filter function depicted in FIG. 6, a horizontal axis indicates a difference between a target pixel signal and a peripheral pixel signal, and a vertical axis indicates a filter output value. A peripheral pixel signal whose difference between the target pixel signal and the peripheral pixel signal is equal to or greater than a threshold value $\epsilon$ is replaced by "0" to carry out the filtering process. That is to say, with respect to any peripheral pixel, if data of a peripheral pixel whose difference between the target pixel signal and the peripheral pixel signal exceeds the threshold value $\epsilon$, the data of such peripheral pixel is replaced by data of the target pixel to perform the smoothing. The first embodiment discloses, as an example, a case where an epsilon filter represented by the filter function in FIG. 6. Furthermore, the filter functions are not limited to the filter function represented in FIG. 6.

An operation of a filtering process in the image processing circuit 2 is now discussed. In one implementation, upon initiation of the filtering process, pixel data is sequentially read from the two-dimensional storage area 3a of the SDRAM 3 with burst operations. The pixel data is applied to the filtering unit 11 via the arbitration unit 12 on a pixel-by-pixel basis.

In one implementation, the filtering unit 11 is a filtering circuit that performs the filter function in FIG. 6. First, one implementation of the line memory unit 21 is be disclosed with reference to FIGS. 4 and 7. The pixel data PD0, which is read from the two-dimensional storage area 3a of the SDRAM 3 and equivalent to one (1) pixel, is applied to the flip-flop FF0 of the line memory unit 21.

The pixel data PD1, which is the pixel data of one (1) cycle before, is held in the flip-flop FF0. The flip-flop FF1 holds the pixel data PD2, which is the pixel data of one further (1) cycle before. The flip-flop FF2 holds the pixel data PD3, which is the pixel data of one further (1) cycle before. The flip-flop FF3 holds the target pixel data PDR, which is the target pixel data of one further cycle before. In the same manner, each of the flip-flops FF4 to FF7 holds pixel data PD4 to PD7, each of which is the pixel data of one further cycle before. As illustrated in FIG. 7, the target pixel data PDR, equivalent to, one (1) pixel and the pixel data PD0 to PD7, equivalent to, eight (8) pixels may be held, for example, in the line memory unit 21, as continuing data. Here, the tarQet pixel data PDR is the data positioned at the center of the pixel data set, which is equivalent to nine (9) pixels and arranged on a row. The target pixel data PDR under goes the filtering process. The pixel data PD0 to PD7 are the data of the peripheral pixels used for the filtering process. It is needless to say that the concept of "the row" of the line memory unit 21 includes the row of the two-dimensional storage area 3a of the SDRAM 3 and/or the row of the image PI.

The pixel data PD applied from the arbitration unit 12 and the target pixel data PDR retrieved from the flip-flop FF3 are applied to the judgment selection circuit SC0 (arrow line A0 in FIG. 7). The pixel data PD1 retrieved from the flip-flop FF0 and the target pixel data PDR retrieved from the flip-flop FF3 are applied to the judgment selection circuit SC1 (arrow line Al in FIG. 7). In the same manner, each of the pixel data PD2 to PD7 is selected, paired with the target pixel data PDR, and applied to each of the judgment selection circuits SC2 to SC7 (arrow lines A2 to A7 in FIG. 7). With reference to the above disclosed operation, when the target pixel data PDR and the pixel data PD0 to PD7 are on a row, comparison of the target pixel data PDR and each of the pixel data PD0 to PD7 is possible. Furthermore, although the peripheral pixel data are eight (8) pixels, that is, the pixel data PD0 to PD7, in FIGS. 4 and 7, this embodiment is not limited thereto, and a variety of values, such as, sixteen (16) pixels, may be used.

Next, operations of the judgment selection circuits SC0 to SC7 in the selection unit 22 are disclosed. The judgment selection circuits SC0 to SC7 judge whether the target pixel and the peripheral pixel are the pixels belonging to the same photogenic subject or not. If both pixels belong to the same photogenic subject, the data of the peripheral pixel is selected as data that undergoes the filtering process. If the both pixels do not belong to the same photogenic subject, the data of the target pixel is selected as the data that undergoes the filtering process.

As an example, an operation of the judgment selection circuit SC0 will be disclosed with reference to FIG. 5. In one implementation, the subtraction circuit 31 of the luminance data judgment unit 28 calculates a difference between the luminance data Y0 and the target pixel luminance data YR. The Y-difference YD is obtained by converting the result into an absolute value by use of the absolute value conversion circuit 34. The Y-difference YD is compared to the luminance threshold value Yth by the first size-judgment circuit 37. If the Y-difference YD is equal to or less than the luminance threshold value Yth, it is judged that the pixel data PD0 and the target pixel data PDR are the data belonging to the same photogenic subject, and the judgment signal JS1 is defined as "1." On the other hand, if the Y-difference YD is greater than the luminance threshold value Yth, it is not judged that the pixel data PD0 and the target pixel data PDR are the data belonging to the same photogenic subject, and the judgment signal JS1 is defined as "0."

Moreover, the Cb-difference CbD, which is an absolute value of a difference between the chrominance data Cb0 and the target pixel chrominance data CbR, is obtained by the subtraction circuit 32 and the absolute value conversion circuit 35 of the chrominance data judgment unit 29. In the same manner, the Cr-difference CrD, which is an absolute value of a difference between the chrominance data Cr0 and the target pixel chrominance data CrR, is obtained by the subtraction circuit 33 and the absolute value conversion circuit 36. The addition circuit 38 adds the Cb-difference CbD and the Cr-difference CrD, so that the Cb-Cr-difference CD is obtained. The Cb-Cr-difference CD is compared to the chrominance threshold value Cth by the second size-judgment circuit 39. If the Cb-Cr-difference CD is equal to or less than the chrominance threshold value Cth, it is judged that the pixel data PD0 and the target pixel data PDR are the data belonging to the same photogenic subject, and the judgment signal JS2 is defined as "1." On the other hand, if the Cb-Cr-difference CD is greater than the chrominance threshold value Cth, it is not judged that the pixel data PD0 and the target pixel data PDR are the data belonging to the same photogenic subject, and the judgment signal JS2 is defined as "0."

In one implementation, the AND circuit AD1 judges that the pixel data PD0 and the target pixel data PDR are the data belonging to the same photogenic subject only when both of the judgment signals JS1 and JS2 are "1" and outputs the select signal SS at "1." On the other hand, the AND circuit AD1 judges that pixel data PD0 and the target pixel data PDR are not the data belonging to the same photogenic subject, and outputs the select signal SS at "0" when the both of the judgment signals JS1 and JS2 are not "1." The selector SL1 outputs the chrominance data Cb0 as the selective chrominance data SCb0 when the selector signal SS is "1." The selector SL1 outputs the target pixel chrominance data CbR as the selective chrominance data SCb0 when the selector signal SS is "0." In the same manner, the selector SL2 outputs the chrominance data Cr0 as the selective chrominance data SCr0 when the selector signal SS is "1." The selector SL2 outputs the target pixel chrominance data CrR as the selective chrominance data SCr0 when the selector signal SS is "0."

The selective chrominance data SCb0 and SCr0 are determined, as the selective chrominance data SPD0, by the judgment selection circuit SC0.

The same operations are concurrently performed by the judgment selection circuits SC1 to SC7. Thereafter, the judgment selection circuits SC1 to SC7 outputs the selective chrominance data SPD1 to SPD7 and apply them to the calculation circuit 23. The calculation circuit 23 calculates a mean value of the selective chrominance data SCb0 to SCb7, and the post-process chrominance data CbF0 is obtained. A mean value of the selective chrominance data SC1 to SCr7 is also calculated and the post-process chrominance data CrF0 is obtained. The post-process chrominance data CbF0 and CrF0 are sequentially determined by the calculation circuit 23 on a pixel-by-pixel basis. With reference to the above disclosed operation, the filtering process is performed on the target pixel chrominance data CbR and CrR of the target pixel data PDR. Therefrom, the post-process pixel data PDF0 (post-process chrominance data CbF0 and CrF0) with the color noise removed is obtained.

The post-process pixel data PDF0 is stored, on a pixel-by-pixel basis, via the arbitration unit 12, in the two-dimensional storage area 3a of the SDRAM 3. Then the filtering process by the image processing circuit 2 terminates in response to the post-process pixel data PDF0, equivalent to one (1) image, being stored in the two-dimensional storage area 3a.

As disclosed in detail hereinbefore, according to the camera 1 in association with the first embodiment, the filtering process is performed in the filtering unit 11 with use of the target pixel data PDR and the pixel data PD0 to PD7, both data being on a row of the line memory unit 21. By virtue thereof, the filtering unit 11 may have a filter size equivalent to nine (9) pixels, which are wide, in a one-dimensional direction. In consequence, an effective filtering process may be performed on the low-frequency noises, such as, a stripe-like noise ranging over a wide range equal to or greater than five (5) pixels for example.

Note that, when the effective filtering process is performed on the low-frequency noise, it is desirable that a filter size be made larger. A large-capacity line memory capable of holding data on a plurality of rows is desirable when the size of a two-dimensional filter is made larger. In the image processing circuit 2 disclosed hereinbefore, the filtering unit 11 has a one-dimensional filter shape. By virtue thereof, the large-capacity line memory capable of holding data on the plurality of rows is unnecessary even if an enlargement of the filter size is desired. As such, the low-frequency noise may be removed without increasing a circuit-scale.

In addition, use of a larger filter size tends to cause color blurs on boundaries of the photogenic subject during filtering process, and it is desirable that the color blurs be prevented from being generated. To prevent the color blurs, it is desirable that the filtering process be performed with use of the target pixel and the peripheral pixels, both of which belong to the same photogenic subject. When judgment on whether or not the target pixel and the peripheral pixels belong to the same photogenic subject is made only based upon the chrominance data, erroneous judgment may frequently occur because the judgment is made based upon only a single criterion. Furthermore, whether or not the target pixel and the peripheral pixels belong to the same photogenic subject may be judged not only based upon the chrominance data but also based upon the luminance data. As such, the filtering process is performed on the chrominance data when the judgment is made, based upon both of the two criteria, that both types of pixels belong to the same photogenic subject. Therefore, the erroneous judgment may be reduced by virtue of taking advantage of plurality of judgment criteria in judging whether or not the target pixel and the peripheral pixels belong to the same photogenic subject. Consequently, color blur may be prevented from being generated even where the filter size is made larger.

Figure 8A:
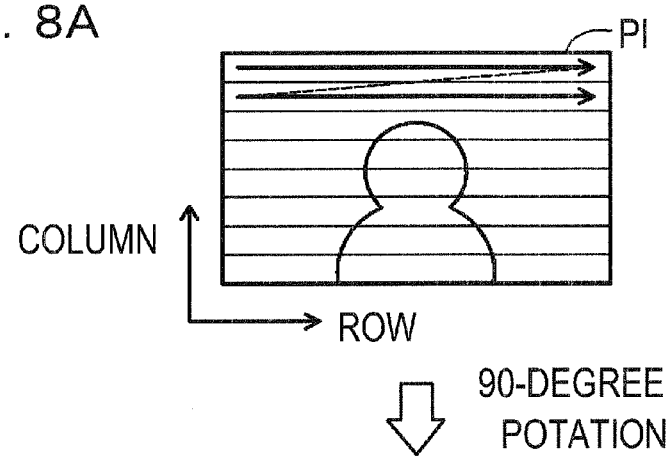
Fig. 8A illustrates an explanation of a first filtering process according to a second embodiment.
Figure 8B:
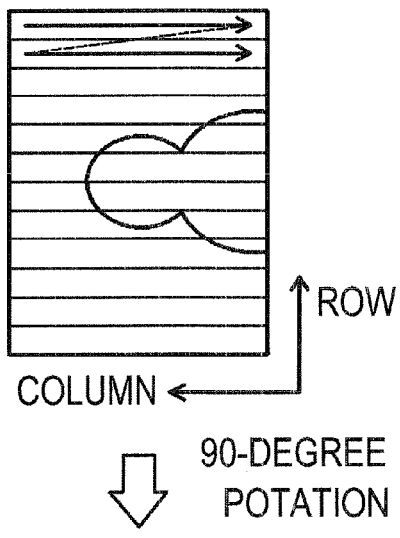
FIG. 8B illustrates an explanation of a first rotation and second filtering process according to the second embodiment.
Figure 8C:
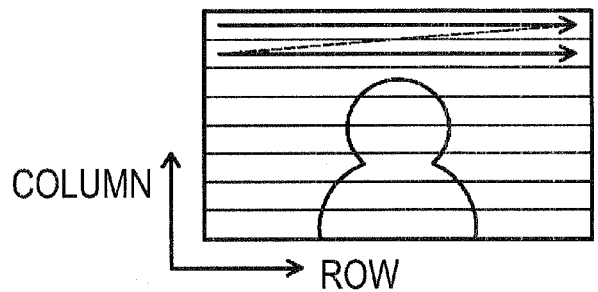
Fig. 8C illustrates an explanation of a second rotation process according to the second embodiment.

A second embodiment will be disclosed with reference to FIGS. 8A, 8B, and 8C. As noted above, the first embodiment discloses the filtering process being performed only in the row direction (horizontal direction) with use of the one-dimensional filter. The second embodiment discloses a two-dimensional filtering process to be performed by executing filtering processes in the row direction and a column direction (vertical direction), respectively, with use of the one-dimensional filter. Note that, since structures, or the like, of the camera 1 and the filtering unit 11 are the substantially the same as those in the first embodiment, detailed descriptions thereof will be reduced or omitted.

An operation will be disclosed with reference to FIGS. 8A, 8B, and 8C. As disclosed in the first embodiment, a first filtering process in the row direction is performed on an image PI. As illustrated in FIG. 8A, the image PI, held in a two-dimensional storage area 3a of an SDRAM 3, is read. First, an uppermost row of the image PI is read in the row direction from a left-most position thereof, and the image PI is retrieved in descending order on a row-by-row basis. Then the retrieved image PI is transferred to a filtering unit 11 via an arbitration unit 12. With respect to the image PI, the pixel data retrieved in a manner giving priority to the row direction is stored in the two-dimensional storage area 3a in a manner giving priority to the row direction, in this process. That is to say, the pixel data is stored in the two-dimensional storage area 3a in a state suitable for a burst read operation, by which continuing data is read. For this reason, the image PI may be read from the SDRAM 3 at a high-speed. Then in response to a first filtering process by the filtering unit 11 being completed, the image PI having undergone the filtering process is stored in the SDRAM 3 in the same order as before the filtering process (FIG. 8A).

Next, a second filtering process in the column direction is performed on the image PI. Prior to the second filtering process, a 90-degree rotation process is performed on the image PI. As illustrated in FIG. 8B, with respect to the image PI held in the two-dimensional storage area 3a, an uppermost row of the image PI is read in the row direction from a left-most position thereof, and the image PI is retrieved in descending order on a row-by-row basis to be applied to an image rotation unit 15.

A counterclockwise 90-degrees rotation process is performed on the image PI by the image rotation unit 15. Then, with respect to the image PI having undergone the rotation process, an uppermost row in a column direction is stored in the two-dimensional storage area 3a, from a left-most position thereof. As such, the image PI is stored in the tow-dimensional storage area 3a in descending order on a row-by-row basis (FIG. 8B).

In one implementation, the image rotation unit 15, sequentially generating addresses in the column direction, performs address reassignment so that continuing addresses in the column direction may be assigned to each pixel data of the image PI. Thereafter, with respect to the image PI, the retrieved pixel data is stored in the two-dimension storage area 3a in a manner giving priority to the column direction.

Then a second filtering process in the column direction is performed.

During the filtering process, the image PI is held in the two-dimensional storage area 3a of the SDRAM 3, as the pixel data continuing in the column direction. For this reason, the image PI may be read from the SDRAM 3 at a high speed in a manner giving priority to the column direction. In response to the second filtering process by the filtering unit 11 being completed, the image PI having undergone the filtering process is stored in the SDRAM 3 in the same order as before the filtering process, as depicted in FIG. 8A.

Thereafter, a clockwise 90-degree rotation process is performed on the image PI by the image rotation unit 15. Then address re-reassignment is performed so that the continuing addresses in the column direction may be assigned to each pixel data of the image PI (FIG. 2B). This operation allows the image PI having undergone the two-dimensional filtering process to be obtained.

As disclosed in detail herein before, according to a camera 1 in association with the second embodiment, the filtering process is performed once in the row direction and once in the column direction. By virtue thereof, the two-dimensional filtering process may be possible by use of the filtering unit 11 having a one-dimensional filter shape.

In addition, a burst transfer method used by the SDRAM 3 has a characteristic that the SDRAM may perform reading/writing of the continuing data at high-speed. Conversely, access speed by the burst transfer method greatly decreases when a large amount of discontinuous small pieces of data are read/written. For this reason, as illustrated in FIG. 8A, when the pixel data is held in the two-dimensional storage area 3a in a state where the pixel data are continued in the row direction, a data access speed in the row direction is high, but data access speed is made low in the column direction. Accordingly, the image rotation unit 15 reassigns the addresses so that the continuing addresses in the column direction are assigned to each pixel data of the image PI in a stage before the data access when accessing the data in the column direction is necessary. Consequently, since the data access speed in the column direction is enhanced, a reduced filtering process time may be achieved. In addition, since the image rotation unit 15, which serves as a general-purpose macro, may be taken advantage of, it is unnecessary to provide an additional circuit, so that an increase in circuit-scale may be suppressed.

Note that the number of filtering process iterations for in the row direction and in the column direction is not limited to one time. A color shift noise may be more effectively removed by increasing the number of iterations of the filtering processes in the row direction, such as two iterations, and the number of times of the filtering process in the column direction, such as, two iterations. Moreover a circuit used for sequentially generating the addresses in the column direction is not limited to the image rotation circuit 15. The address reassignment is performed so that the continuing addresses in the column direction may be assigned to each pixel data of the image PI by use of a coordinates conversion unit 17.

Figure 9:
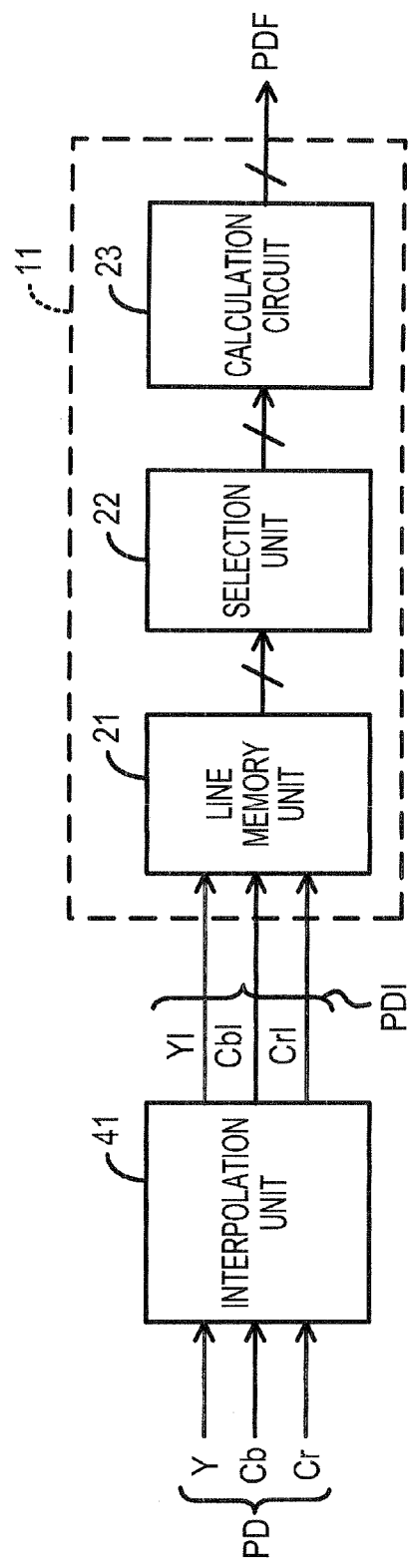
FIG. 9 illustrates a circuit of an interpolation unit 41 according to a third embodiment.
Figure 10:
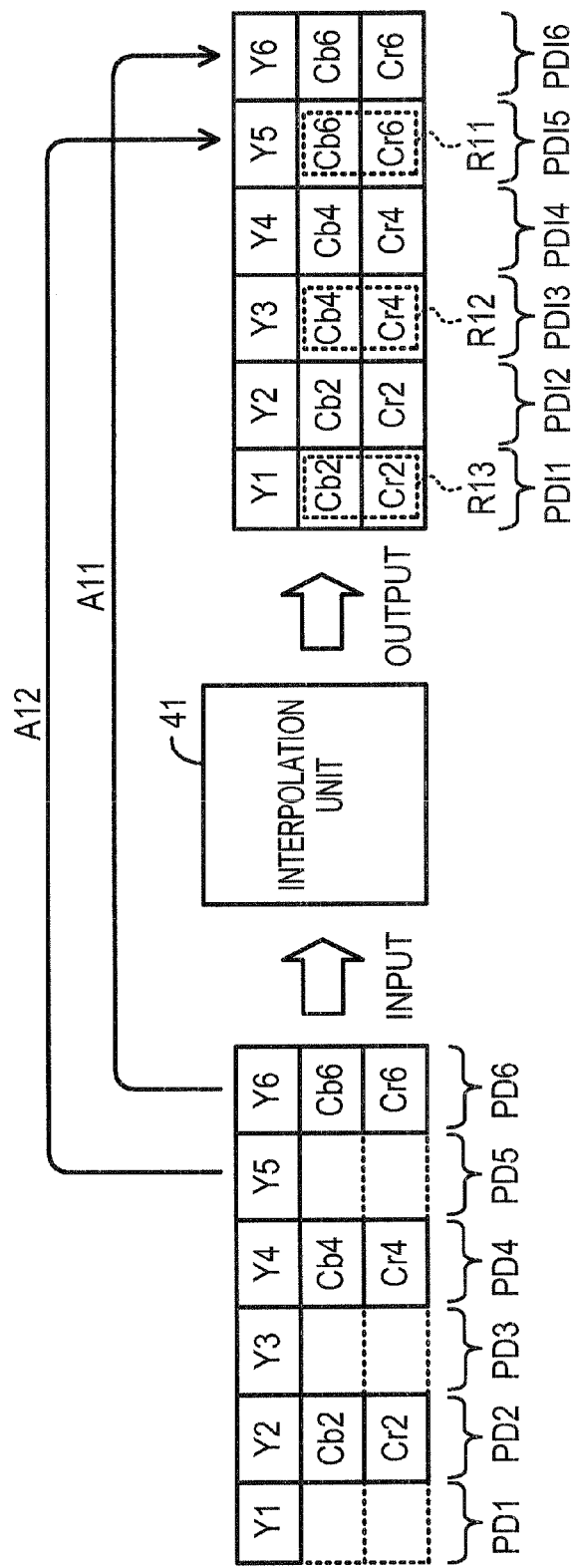
FIG. 10 illustrates an explanation of an operation of the interpolation unit 41 according to a third embodiment.

A third embodiment will be disclosed with reference to FIGS. 9 and 10. The first embodiment discloses a filtering process performed on the pixel data of the "Y, Cb, Cr 4:4:4" format, in which a piece of luminance data Y, a piece of chrominance data Cb, and a piece of chrominance data Cr correspond to one (1) pixel. The third embodiment will disclose a filtering process that is performed on pixel data where a format with less chrominance data Cb and Cr relative to the luminance data Y in a row direction, such as, a "Y, Cb, Cr 4:2:2" format. Note that, since structures, or the like, of a camera 1 are substantially the same as that of the first embodiment, a detailed description thereof will be reduced or omitted.

FIG. 9 illustrates an interpolation unit 41 according to a third embodiment. The interpolation unit 41 is provided at an input stage of a filtering unit 11. The interpolation unit 41 includes a memory unit (not shown) associated with the chrominance data Cb and Cr. Since the memory unit has already to be provided with a known structure, a detailed description thereof will be reduced or omitted. Pixel data PD (luminance data Y, chrominance data Cb, and chrominance data Cr) is applied to the interpolation unit 41 from an arbitration unit 12, and interpolation pixel data PDI (interpolation luminance data YI, interpolation chrominance data CbI, and interpolation chrominance data CrI) is retrieved.

An operation is be illustrated in FIG. 10. As depicted in FIG. 10, the chrominance data CB and Cr of the pixel data PD1, PD3, and PD5 are thinned, with respect to pixel data PD1 to PD6 of the "Y, Cb, Cr, 4:2:2" format. The pixel data PD6 to PD1 are sequentially applied to the interpolation unit 41 on a cycle-by-cycle basis. When the pixel data PD6 whose chrominance data is not thinned is applied at a first cycle, the interpolation unit 41 outputs the pixel data PD6, as an interpolation pixel data PDI6 (arrow line A11). Moreover, chrominance data Cb6 and Cr6 are held in the memory unit (not shown) of the interpolation unit 41.

In a subsequent cycle, when the pixel data PD5 with thinned chrominance data is applied, the interpolation unit 41 outputs the chrominance data Cb6 and Cr6 held in the memory unit, as interpolation pixel data PDI5, in with luminance data Y5 (arrow line A12 and area R11). In the same manner, an operation of holding the chrominance data Cb and Cr of the pixel data, in which the chrominance data is not thinned, and an operation of combining the chrominance data Cb with chrominance data Cr each held in the luminance data Y of the pixel data with the chrominance data being thinned, are repeatedly performed (areas R12 and R13).

With the operation disclosed above, the chrominance data thinned in the row direction is interpolated, and the interpolation pixel data PDI thus interpolated is applied to the filtering unit 11. Then the filtering process is performed by the filtering unit 11 based upon the method disclosed above. With the method disclosed above, the filtering process may be performed in the row direction by use of the filtering unit 11 on the pixel data of, such as, the "Y, Cb, Cr 4:2:2" format with the chrominance data being thinned.

The third embodiment discloses a format where a piece of chrominance data Cb and a piece of chrominance data Cr are provided relative to two pieces of luminance data Y. Note, however, that the third embodiment is not limited thereto. For example, in a case where a piece of chrominance data Cb and a piece of chrominance data Cr are provided relative to four pieces of luminance data Y. A filtering process may be possible by performing the operation of holding the chrominance data Cb and Cr of the pixel data without the chrominance data being thinned, and an operation of combining the chrominance data Cb with the chrominance data Cr held in the luminance data of the pixel data with the chrominance data being thinned.

Figure 11:
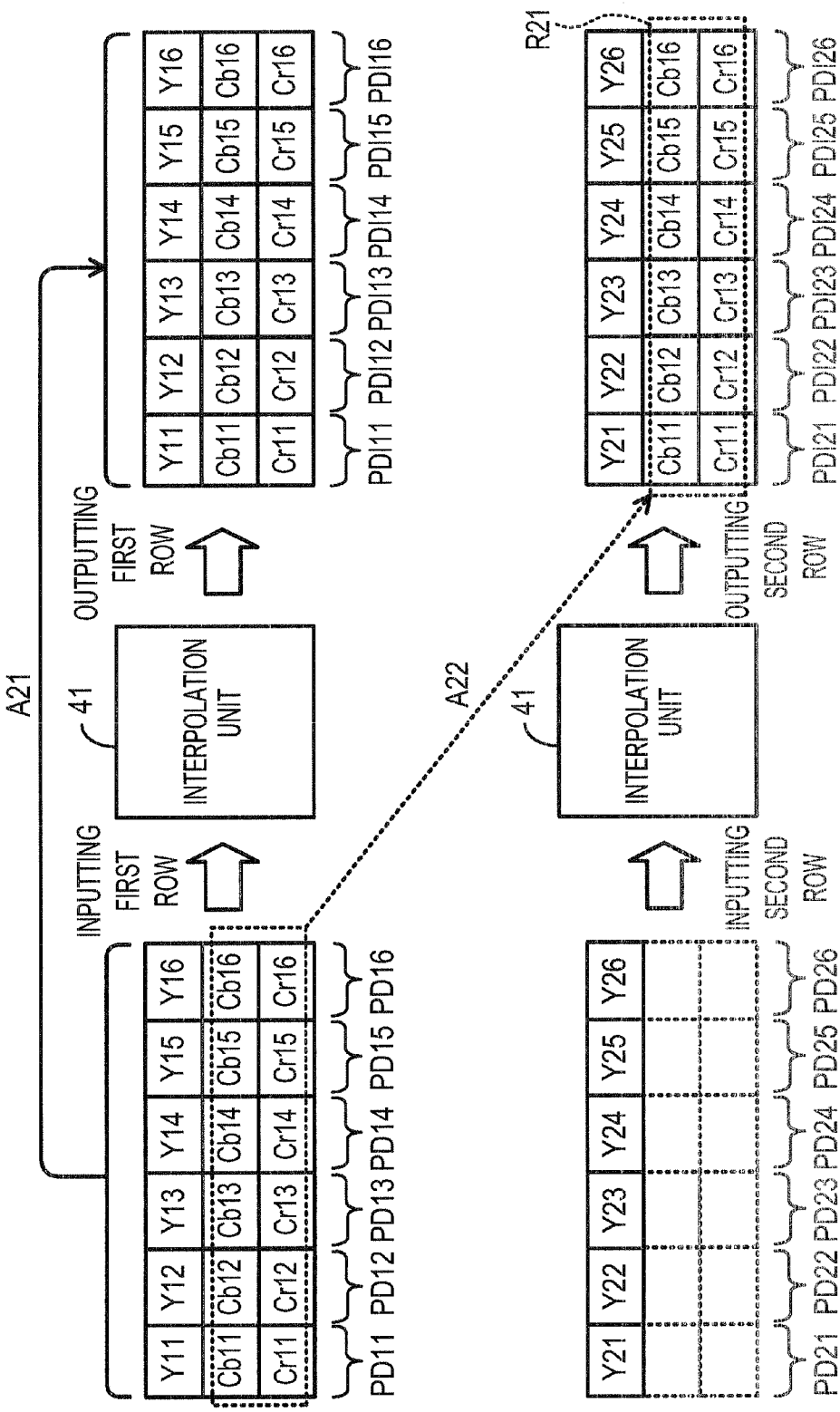
FIG. 11 illustrates an explanation of an operation of an interpolation unit 41 according to a fourth embodiment.

A fourth embodiment will be disclosed with reference to FIG. 11. The fourth embodiment will disclose a filtering process performed on pixel data where a format with less chrominance data Cb and Cr relative to the luminance data Y in a row direction, such as, a "Y, Cb, Cr 4:2:0" format is used. Note that, since a structure or the like of a camera 1 is the same as that of the first embodiment and a structure or the like of an interpolation unit 41 is the same as that of the third embodiment, detailed descriptions thereof will be reduced or omitted.

As illustrated in FIG. 11, the "Y, Cb, Cr 4:2:0" format is a format where the chrominance data Cb and Cr are not thinned in pixel data PD 11 to PD 16 on a first row and the chrominance data Cb and Cr are thinned in pixel data PD21 to PD26 on a second row. The pixel data PD16 to PD11 on the first row are sequentially applied to the interpolation unit 41 on a cycle-by-cycle basis. Then the pixel data PD26 to PD21 on the second row are sequentially applied on the cycle-by-cycle basis.

When the pixel data PD11 to PD16 whose chrominance data are thinned and which are arranged on the first row are applied, the interpolation unit 41 outputs the pixel data PD11 to PD16, as interpolation pixel data PdI11 to PDI16 (arrow line A21). Chrominance data Cb11 to Cb16 and Cr11 to Cr16 are held in a memory unit (not shown) of the interpolation unit 41.

Next, when the pixel data PD21 to PD26 whose chrominance data are thinned and which are arranged on the second row are applied, the interpolation unit 41 outputs the chrominance data Cb11 to Cb16 and Cr11 to Cr16 held in the memory unit, as interpolation pixel data PDI21 to PDI26, in with luminance data Y21 to Y26 (arrow line A22 and area R21).

With the operation disclosed above, the chrominance data thinned in a column direction is interpolated, and interpolation pixel data PDI thus interpolated is applied to the filtering unit 11. Then the filtering process by the filtering unit 11 is performed by use of the method disclosed above. Consequently, the filtering process may be performed, by use of the filtering unit 11, on the pixel data whose chrominance data are thinned in the column direction, such as, the "Y, Cb, Cr 4:2:0" format.

The fourth embodiment discloses a format where the chrominance data Cb and Cr equivalent to one (1) row are provided relative to the luminance data Y equivalent to two rows. Note, however, that the fourth embodiment is not limited thereto. The filtering process may be possible even in a case where the chrominance data Cb and Cr equivalent to one (1) row are provided relative to the luminance data Y equivalent to, for example, four rows or the like.

Furthermore, the present invention is not limited to the embodiments disclosed above and various changes and modifications may be possible without departing from the scope of the present invention. In the filter function (FIG. 6) of the epsilon filter used in the first embodiment, a condition judgment between the target pixel and respective peripheral pixel values is performed. If a condition is satisfied, the data of the peripheral pixel(s) is/are selected as the data for the filtering process. Conversely, if the condition is not satisfied, the data of the target pixel is selected as the data for the filtering process.

Figure 12:
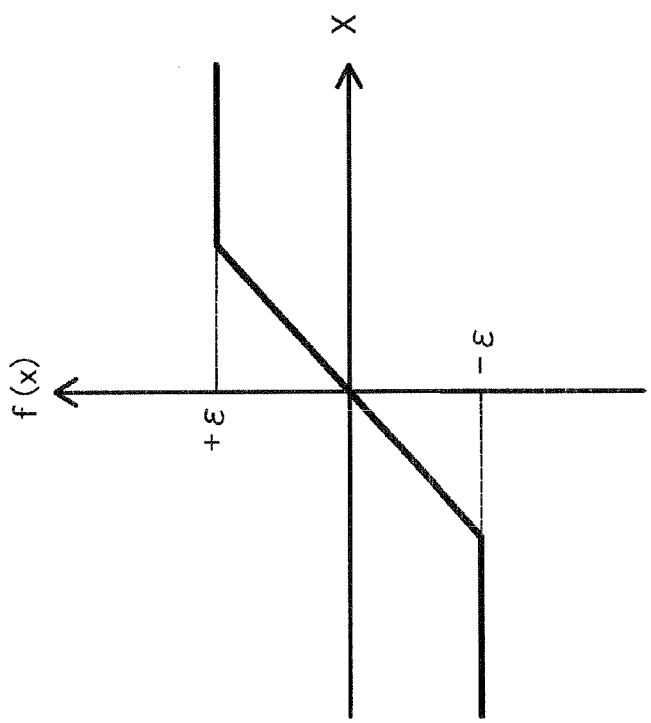
FIG. 12 illustrates a graph (2) indicating a filter function.

Note, however, that the filter function of the epsilon filter is not limited to the function represented in FIG. 6. In one implementation, the filter function represented in FIG. 12 may be used. FIG. 12 is a filter function in Equation (3) where $\beta$ is equal to (=) $\epsilon$. In the filter function in FIG. 12, with respect to peripheral pixel data where a difference between the target pixel signal and the peripheral pixel signal exceeds the threshold value E, the peripheral pixel data is replaced by data that is closer to a peripheral pixel data value among the target pixel data values plus and minus the threshold value $\epsilon$. To achieve the filter function in FIG. 12, it is desirable that the filtering unit 11 (in FIG. 4) include a judgment selection circuits SC0$a$ to SC7$a$ instead of the judgment selection circuit SC0 to SC7.

Figure 13:
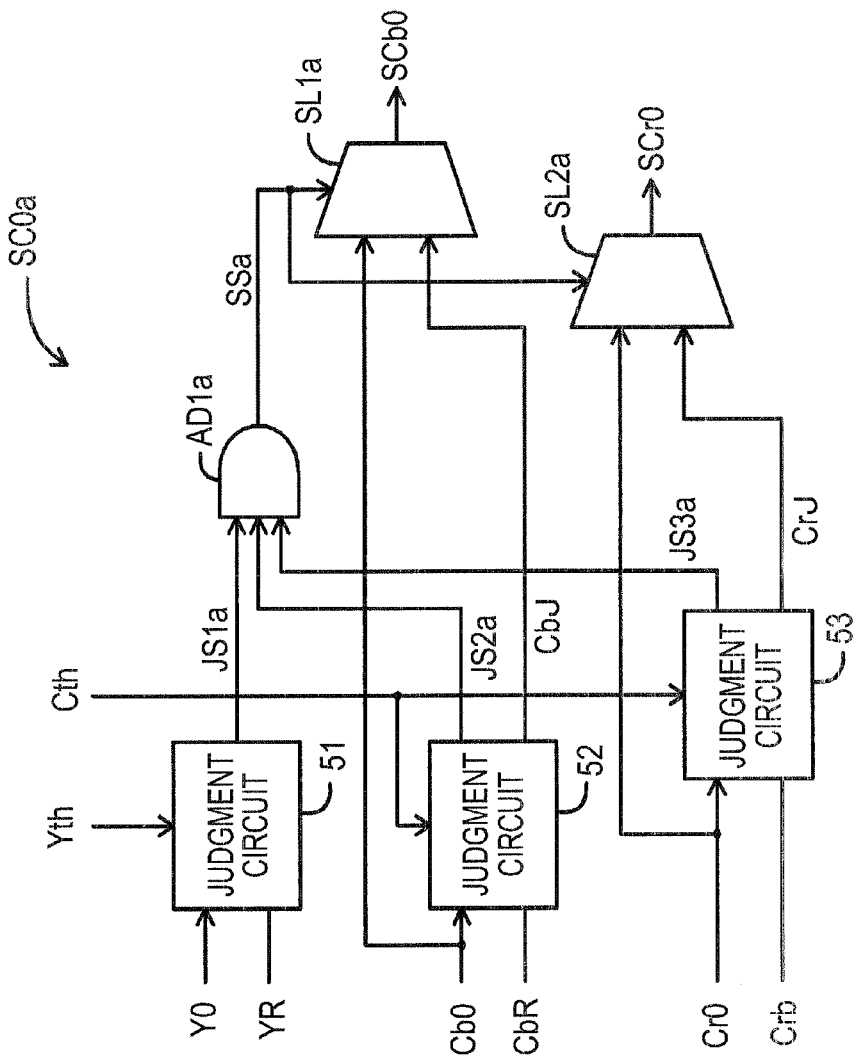

FIG. 13 illustrates an internal circuit of the judgment selection circuit SC0$a$. The luminance data Y0, the target pixel luminance data YR and the luminance threshold value Yth are applied to a judgment circuit 51. A judgment signal JSa1 retrieved from the judgment circuit 51 is applied to an AND circuit AD1$a$. The chrominance data Cb0, the target pixel chrominance data CbR, and the chrominance threshold value Cth are applied to a judgment circuit 52. A judgment signal Ja2 retrieved from the judgment circuit 52 is applied to the AND circuit AD1*a*, and judgment chrominance data CbJ retrieved from the judgment circuit 52 is applied to a selector SL1*a*. In the same manner, the chrominance data Cr0, the target pixel chrominance data CrR, and the chrominance threshold value Cth are applied to a judgment circuit 53. A judgment signal JS3*a* retrieved from the judgment circuit 53 is applied to the AND circuit AD1*a*, and the judgment chrominance data CbJ retrieved from the judgment circuit 53 is applied to a selector SL2*a*. A selector signal SSa is retrieved from the AND circuit AD1*a*, and the selector signal SSa is applied to the selector SL1*a* and the selector SL2*a*. The selective chrominance data SCb0 is retrieved from the selector SL1*a*, and the selective chrominance data SC0 is retrieved from the selector SL2*a*. Note that, since structures of the judgment selection circuits SC1*a* to SC7*a* are substantially the same as that of the judgment selection circuit SC0*a*, detailed descriptions thereof will be reduced or omitted.

Figure 14:
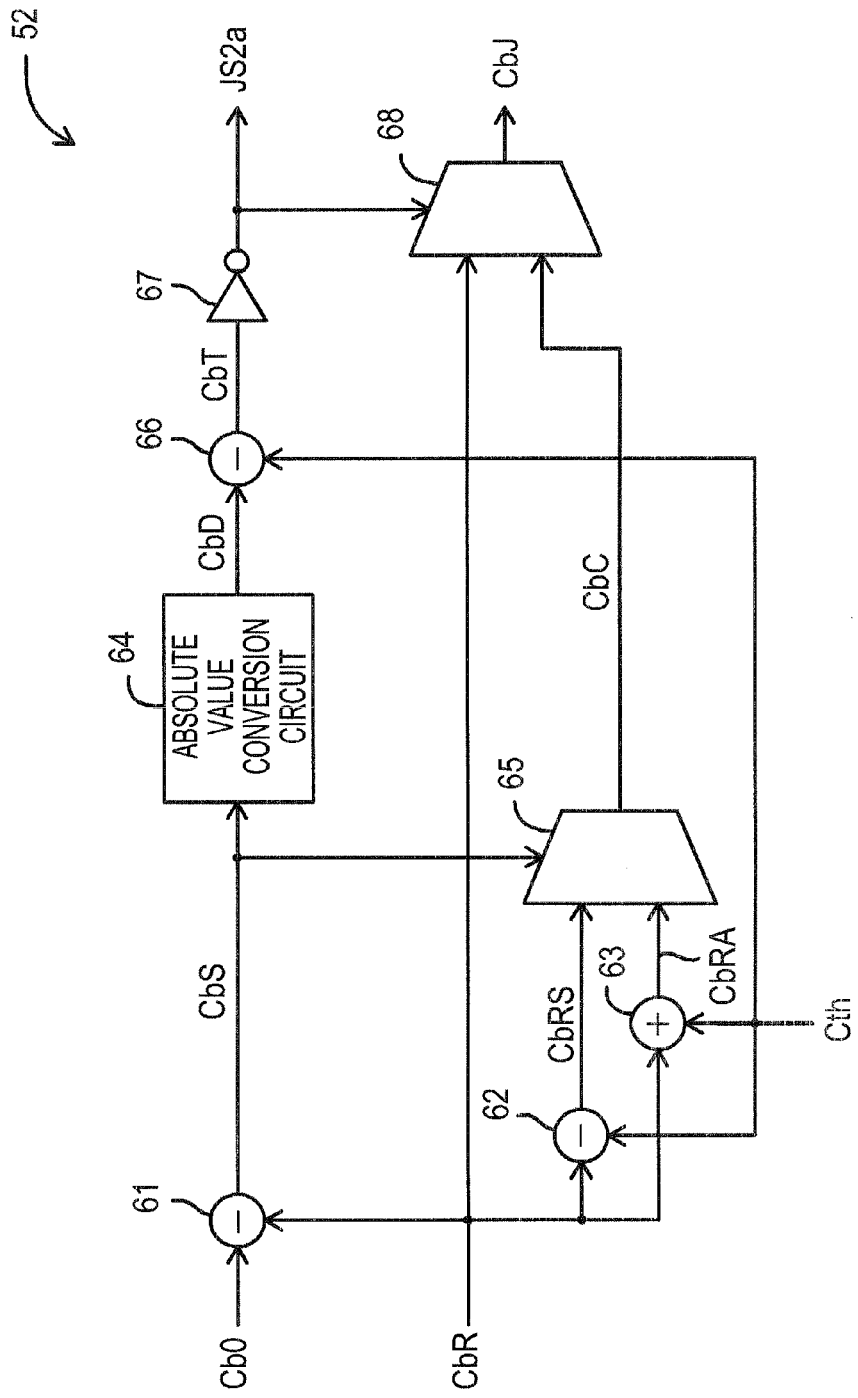
FIG. 14 illustrates an internal circuit of a judgment circuit 52.
Figure 15:
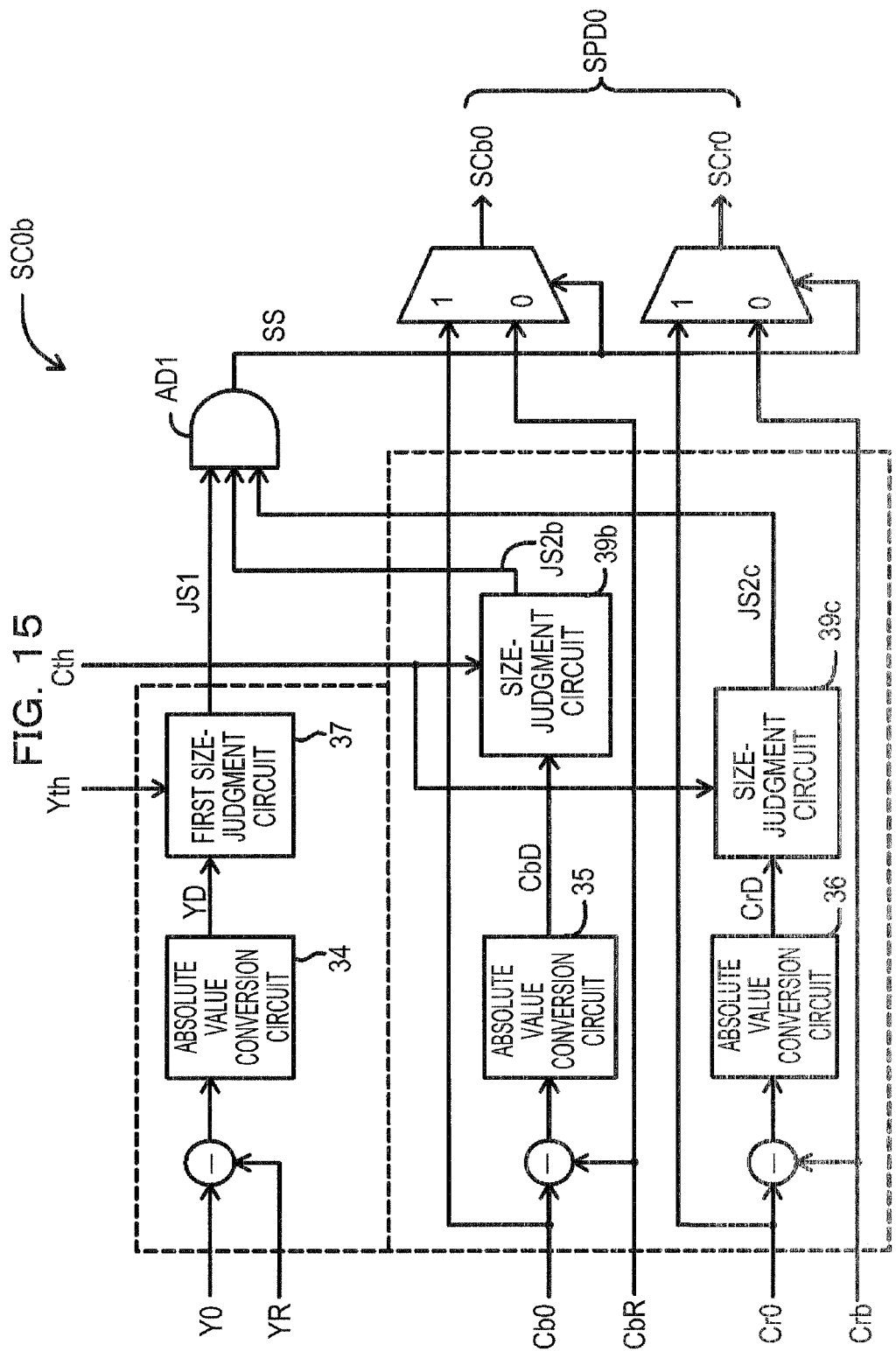
FIG. 15 illustrates an internal circuit of a judgment selection circuit SC0b.

FIG. 14 illustrates an internal circuit of the judgment circuit 52. In the depicted judgement circuit 52, the chrominance data Cb0 and (the target pixel chrominance data) CbR are applied to a subtraction circuit 61, and a difference CbS is determined. The difference CbS is applied to an absolute value conversion circuit 64, and the Cb-difference CbD is determined. The Cb-difference CbD and the chrominance threshold value Cth are applied to a subtraction circuit 66, and a different CbT is determined. The difference CbT is applied to an inverter 67, and the judgment signal JS2*a* is determined. The target pixel chrominance data CbR and the chrominance threshold value Cth are applied to a subtraction circuit 62, and a subtraction value CbRS is determined. The target pixel chrominance data CbR and the chrominance threshold value Cth are applied to an addition circuit 63, and an addition value CbRA is determined. The subtraction value CbRS, the addition value CbRA, and the difference CbS are applied to a selector 65, and modified chrominance data CbC is determined. The target pixel chrominance data CbR, the modified chrominance data CbC, and the judgment signal JS2*a* are applied to a selector 68, and the judgment chrominance data CbJ are determined. Note that, since structures of judgment circuits 51 and 53 are substantially the same as that of the judgment circuit 52, detailed descriptions thereof will be reduced or omitted.

An operation of the judgment selection circuit SC0*a* will be disclosed and depicted in FIG. 14. In FIG. 14, the target pixel chrominance data CbR is subtracted from the chrominance data Cb0 by the subtraction circuit 61, and the difference CbS is calculated. The Cb-difference CbD is obtained by converting the difference CbS to an absolute value by use of the absolute value conversion circuit 64. The chrominance threshold value Cth is subtracted from the Cb-difference CbD by the subtraction circuit 66, and the difference CbT is calculated. The difference CbT is applied to the inverter 67. If the Cb-difference CbD is smaller than the chrominance threshold value Cth, the difference CbT becomes negative, and the judgment signal JS2*a* retrieved from the inverter 67 becomes "one (1)." On the other hand, if the Cb-difference CbD is equal to or greater than the chrominance threshold value Cth, the difference CbT becomes equal to or greater than zero (0), and the judgment signal JS2*a* retrieved from the inverter 67 becomes "zero (0)."

The chrominance threshold value Cth is subtracted from the target pixel chrominance data CbR by the subtraction circuit 62, and the subtraction value CbRS is calculated. The target pixel chrominance data CbR is added to the chrominance threshold value Cth by the addition circuit 63, and the addition value CbRA is calculated. The subtraction value CbRS, the addition value CbRA, and the difference CbS are applied to the selector 65.

If the difference CbS has a positive sign, the selector 65 judges that the addition value CbRA is closer to the chrominance data Cb0 than the subtraction value CbRS. Consequently, the selector 65 selects the addition value CbRA to output as the modified chrominance data CbC. On the other hand, when the difference CbS has a negative sign, the selector 65 judges that the subtraction value CbRS is closer to the chrominance data Cb0 than the addition value CbRA. Consequently, the selector 65 selects the subtraction value CbRS to output as the modified chrominance data CbC. If the judgment signal JS2*a* is "one (1)" (if the Cb-difference CbD is smaller than the chrominance threshold value Cth), the selector 68 outputs the target pixel chrominance data CbR as the judgment chrominance data CbJ, and if the judgment signal JS2*a* is "zero (0)" (if the Cb-difference CbD is equal to or greater than the chrominance threshold value Cth), the selector 68 outputs the modified chrominance data CbC as the judgment chrominance data CbJ.

Note that the operations of the judgment circuits 51 and 53 are substantially the same as that of the judgment circuit 52, detailed descriptions thereof will be reduced or omitted.

In the judgment selection circuit SC0*a* in FIG. 13, only when all the judgment signals JS1*a* to JS3*a* are "one (1)," does the AND circuit AD1*a* judge that the pixel data PD0 and the target pixel data PDR belong to the same photogenic subject and therefore outputs the selector signal SSa of "one (1)." If one or any of the judgment signals JS1*a* to JS3*a* are not "one (1)," the AND circuit AD1*a* judges that the pixel data PD0 and the target pixel data PDR do not belong to the same photogenic subject and outputs the selector signal SSa of "zero (0)." If the selector signal SS is "one (1)," the selector SL1*a* outputs the chrominance data Cb0 as the selective chrominance data SCb0, and if the selector signal SS is "zero (0)," the selector SL1*a* outputs the judgment chrominance data Cb0 as the selective chrominance data SCb0. In the same manner, the selector SL2*a* outputs the chrominance data Cr0 as the selective chrominance data SCr0 if the selector signal SS is "one (1)," and the selector SL2*a* outputs the judgment chrominance data CrJ as the selective chrominance data SCr0 if the selector signal SS is "zero (0)." The selective chrominance data SCb0 and SCr0 are retrieved from the judgment selection circuit SC0 as the selective chrominance data SPD0.

Note that, since operations of the judgment selection circuit SC1*a* to SC7*a* are the same as that of the judgment selection circuit SC0*a*, detailed descriptions thereof will be reduced or omitted. Subsequently, the filtering process by use of the filter function illustrated in FIG. 12 may be performed in response to the operations disclosed in the first embodiment being performed by the filtering unit 11.

In one implementation, it is judged that the pixel data PD0 and the target pixel data PDR belong to the same photogenic subject, [1] if the Y-difference YD is equal to or less than the luminance threshold value Yth, and [2] the Cb-Cr-difference CD is equal to or less than the chrominance threshold value Cth, in the judgment selection circuits SC0 to SC7 in association with the first embodiment. Note, however, that the judgment condition is not limited thereto. For example, like a judgment selection circuit SC0*b* illustrated in FIG. 15, size-judgment circuits 39*b* and 39*c* may be provided, instead of the second size judgment circuit 39. The Cb-difference CbD and the chrominance threshold value Cth retrieved from the absolute value conversion circuit 35 are applied to the size-judgment circuit 39*b*, and a judgment signal JS2*b* is determined If the Cb-difference CbD is equal to or less than the chrominance threshold value Cth, the judgment signal JS2b is defined as "one (1)," and if the Cb-difference CbD is greater than the chrominance threshold value Cth, the judgment signal JS2b is defined as "zero (0)." The Cr-difference CrD and the chrominance threshold value Cth retrieved from the absolute value conversion circuit 36 are applied to the size-judgment circuit 39c, and a judgment signal JS 2c is retrieved. If the Cb-difference CrD is equal to or less than the chrominance threshold value Cth, the judgment signal JS2c is defined as "one (1)," and if the Cb-difference Cr1) is greater than the chrominance threshold value Cth, the judgment signal JS2c is defined as "zero (0)." The judgment signals JS1, JS2b, and JS2c are applied to the AND circuit AD1. It is judged that the pixel data PD0 and the target pixel data PDR belong to the same photogenic subject in the circuits disclosed above, [1] if the Y-difference YD is equal to or less than the luminance threshold value Yth, [2] if the Cb-difference CbD is equal to or less than chrominance threshold value Cth, and [3] if the Cr-difference CrD is equal to or less than the chrominance threshold value Cth.

Moreover, a first chrominance threshold value Cbth and a second chrominance threshold value Crth may be provided instead of the chrominance threshold value Cth. In the above case, the first chrominance threshold value Cbth is applied to the size-judgment circuit 39b, and the first chrominance threshold value Cbth and the Cb-difference CbD are compared, in FIG. 15. Moreover, the second chrominance threshold value Crth is applied to the size-judgment circuit 39c, and the second chrominance threshold value Crth and the Cr-difference CrD are compared to determine which is greater or lesser. Additionally, a finer filtering process is possible since the chrominance data Cb in association with blue color and the chrominance data Cr in association with the red color may be separately judged with the operation disclosed above.

The chrominance threshold value Cth and the luminance threshold value Yth are fixed values that are freely set by users, or the like, in the first embodiment. Note, however, that the embodiments disclosed above are not limited thereto. It may be possible that the luminance threshold value Yth and the chrominance threshold value Cth are set in response to the value of the luminance data Y of the target pixel.

Figure 16:
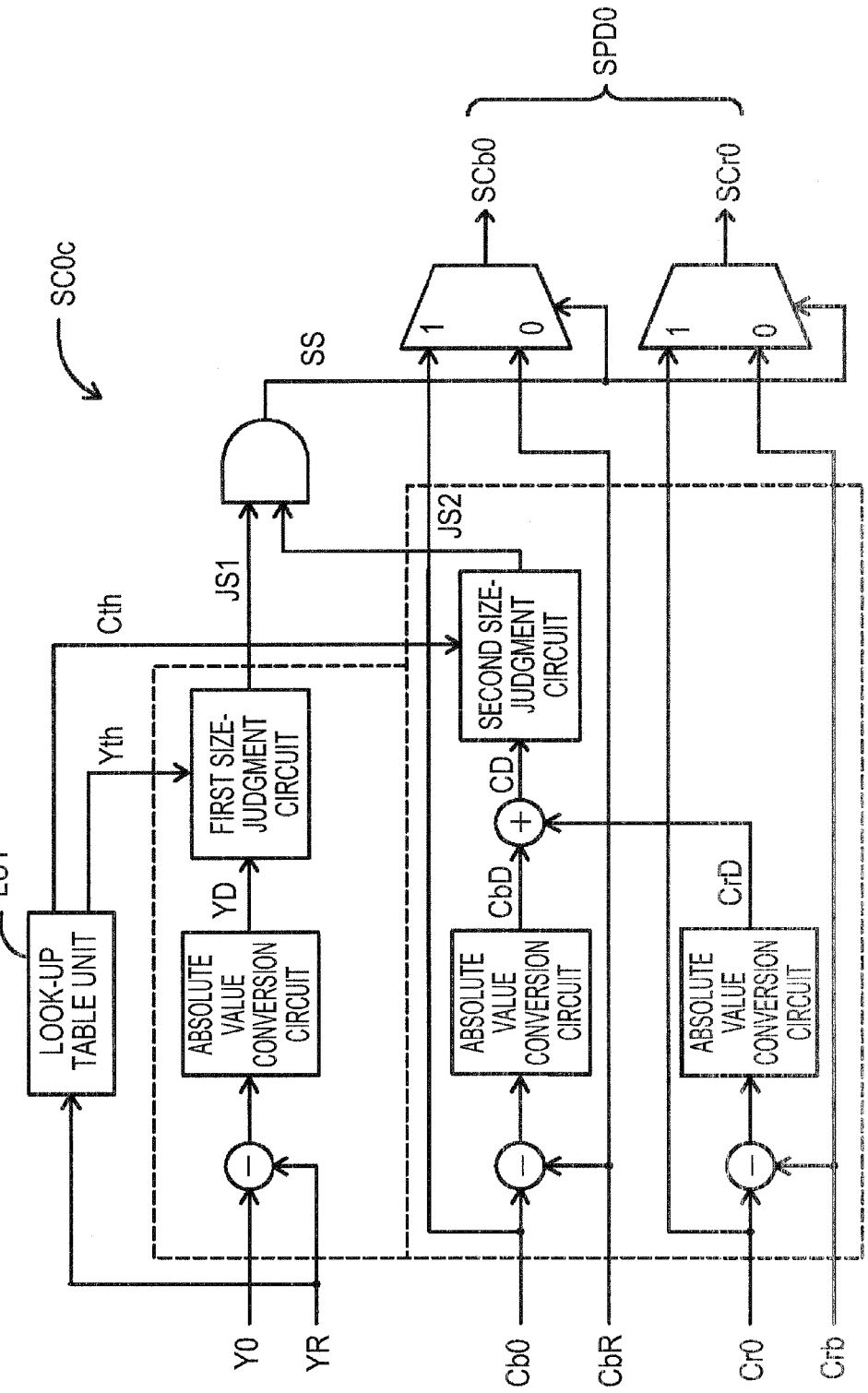
FIG. 16 illustrates an internal circuit of a judgment selection circuit SC0c.

An example judgment selection circuit SC0c is illustrated in FIG. 16 The depicted embodiment includes a look-up table unit LUT. The look-up table unit LUT holds an association table in which values of the target pixel luminance data YR are associated with values of the luminance threshold values Yth and the chrominance threshold values Cth. In response to a piece of target pixel luminance data YR being applied, the look-up table unit LUT outputs a given luminance threshold value Yth and a given chrominance threshold value Cth, both corresponding to a value of the target pixel luminance data YR. For this reason, detailed threshold values corresponding to luminance levels of the target pixels may be set, so that a more exact judgment may be achieved.

Note that the look-up table unit LUT may hold an association table in which the values of the target pixel luminance data YR are associated with the luminance threshold values Yth, the first chrominance threshold values Cbth, and the second chrominance threshold values Crth. In the case disclosed above, in response to the target pixel luminance data YR being applied, the look-up table unit LUT outputs the luminance threshold value Yth, the first chrominance threshold value Cbth, and the second chrominance threshold value Crth, each corresponding to the value of the target pixel luminance data YR. Consequently, a more detailed filtering process may be achieved.

The above embodiments disclose the filtering process of the image data based upon the "Y, Cb, Cr" format. However, the same filtering process may be performed on image data of an "R, G, B" format. In the case disclosed above, pixel data R, G, and B are applied to the filtering unit 11 illustrated in FIG. 4, and post-process pixel data RF, GF, and BF are retrieved. Note that in one implementation it is desirable that the filtering unit 11 include judgment selection circuits SC0d to SC7d instead of the judgment selection circuits SC0 to SC7.

Figure 17:
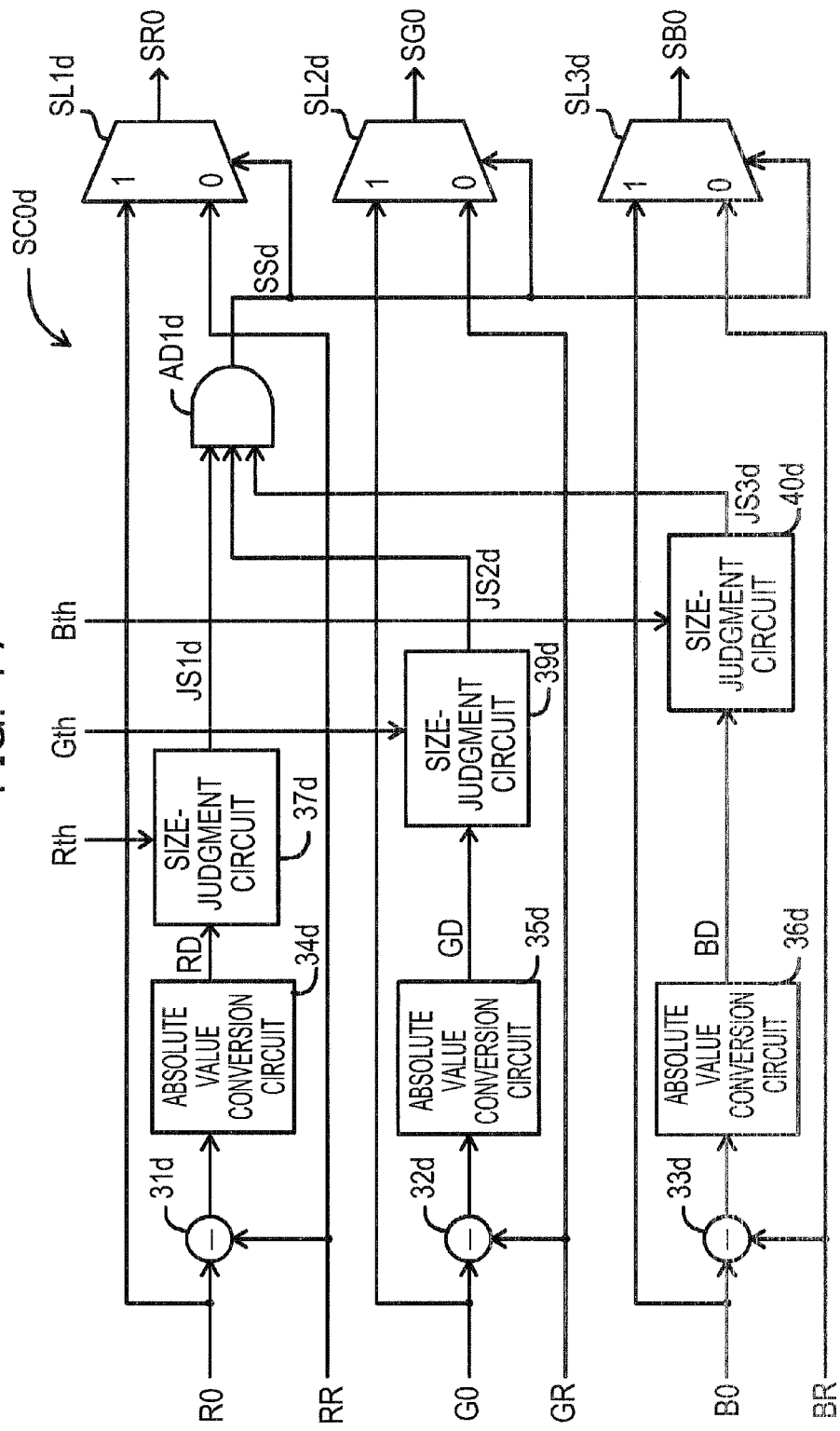
FIG. 17 illustrates an internal circuit of a judgment selection circuit SC0d.

FIG. 17 illustrates an internal circuit of the judgment selection circuit SC0d. A difference between data R0 and target pixel data RR is calculated by a subtraction circuit 31d. An absolute value conversion circuit 34d outputs an absolute value of a calculation result, calculated by the subtraction circuit 31d, as an R-difference RD. A size judgment circuit 37d outputs a judgment signal JS1d of "one (1)" if the R-difference RD is equal to or less than an R threshold value Rth and outputs a judgment signal JS1d of "zero (0)" if the R-difference RD is greater than the R threshold value Rth. A subtraction circuit 32d calculates a difference between data G0 and target pixel data GR. An absolute value conversion circuit 35d outputs an absolute value of a calculation result, calculated by the subtraction circuit 32d, as a G-difference GD. A size-judgment circuit 39d outputs a judgment signal JS2d of "one (1)" if the G-difference GD is equal to or less than a G-threshold value Gth and outputs the JS2d of "zero (0)" if the G-difference GD is greater than the G-threshold value. A difference between data B0 and target pixel data BR is calculated by a subtraction circuit 33d. An absolute value conversion circuit 36d outputs an absolute value of a calculation result, calculated by the subtraction circuit 33d, as a B-difference BD. A size-judgment circuit 40d outputs a judgment signal JS3d of "one (1)" if the B-difference BD is equal to or less than a B-threshold value Bth and outputs the judgment signal JS3d of "zero (0)" if the B-difference BD is greater than the B-threshold value Bth.

An AND circuit AD1d outputs a selector signal SSd of "one (1)" only when all the judgment signals JS1d to JS3d are "one (1)." Selectors SL1d to SL3d output the data R0, G0, and B0 as selection pixel data SR0, SG0, and SB0, respectively, if the selector signal SSd is "one (1)." Furthermore, the selectors SL1d to SL3d output the target pixel data RR, GR, and BR, as the selection pixel data SR0, SG0, and SB0, respectively, if the selector signal SSd is "zero (0)." Subsequently, the filtering process according to the present embodiment may also be performed on the image data of the "RGB" format in response to the operations disclosed in the first embodiment being performed by the filtering unit 11.

The embodiments disclose the epsilon filtering process. Note, however, that an essential feature of the present embodiment is to include a one-dimensional filter shape. For this reason, a variety of filtering processes, such as, the low-pass filtering process, the median filtering process, or the like may be possible.

In the low-pass filtering process, coefficients are assigned to the target pixel and each of the peripheral pixels. Then each of pixel data values is multiplied by the coefficient corresponding thereto to calculate a total Sum value, and a data value of the target pixel is replaced by the total sum value. Consequently, the filtering process according to the present invention may be performed by assigning the coefficient to each of the pixels of the one-dimensional filter, in the low-pass filtering process.

In the median filtering process, a plurality of pixel data in an area centered around the target pixel are retrieved. Sizes of these plurality of values are compared to one another, and a median value thereof is obtained. Then a data value of the target pixel is replaced by the median value. In consequences the filtering process according to the present invention may be performed in the median filtering process by obtaining the median value by use of the respective pixels of the one-dimensional filter.

The present embodiments disclose that the filtering unit 11 may be usable as the image processing circuit 2 and the camera 1. Note, however, that the present embodiments are not limited thereto. The present embodiments may be used for any circuits and devices if such circuits and the devices process the images.

It should be noted that the sensor 6 is an example of an image pick-up element, the SDRAM 3 is an example of a memory, the filtering unit 11 is an example of a filtering circuit, and the image rotation unit 15 and the coordinates conversion unit 17 are examples of address generation unit, respectively.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing circuit comprising:
   a memory configured to store an image retrieved from an image pick-up element, wherein the image is written on a plurality of rows of a two dimensional storage area of the memory; and
   a filtering circuit configured to perform a filtering process with respect to each pixel data on a row when the image is written on the plurality of rows of the two-dimensional storage area of the memory, wherein the pixel data on the row is pixel data on a row of the two-dimensional storage area, wherein the filtering circuit further comprises;
      a comparison unit configured to compare pixel data of a target pixel included in the pixel data on the row to each of pixel data of a plurality of peripheral pixels, which neighbors the target pixel, and outputs post-comparison pixel data, the comparison unit further comprises:
         a difference unit configured to obtain a difference value between the pixel data of the target pixel and the pixel data of the plurality of peripheral pixels;
         a judgment unit configured to compare the difference value to a predetermined value; and
         a selection unit configured to select the pixel data of the plurality of peripheral pixels when the difference value is less than the predetermined value and select the pixel data of the target when the difference value is greater than the predetermined value; and
      a calculation circuit configured to obtain post-process target pixel data from at least a portion of a plurality of the post-comparison pixel data.

2. The image processing circuit according to claim 1, wherein
   the filtering circuit performs a filtering process with respect to each pixel data on a same column.

3. The image processing circuit according to claim 2, wherein,
   when the filtering process is performed on the pixel data on the same column by the filtering circuit, an address generation unit, sequentially generating an address in a column direction, reads the pixel data from the two-dimensional storage area.

4. The image processing circuit according to claim 3, wherein
   the address generation unit is an image rotation unit in the image processing circuit.

5. The image processing circuit according to claim 3, wherein
   the address generation unit is a coordinates conversion unit in the image processing circuit.

6. The image processing circuit according to claim 1, wherein,
   when the pixel data is chrominance data and chrominance data corresponding to a portion of pixels is thinned, the filtering circuit performs the filtering process with chrominance data of the pixel neighboring the thinned pixel.

7. The image processing circuit according to claim 1, wherein
   the pixel data includes luminance data and chrominance data;
   the difference unit obtains a luminance data difference value, wherein the luminance data difference value is a difference value between luminance data of the target pixel and luminance data of the plurality of peripheral pixels, and a chrominance data difference value, wherein the chrominance data difference value is a difference value between chrominance data of the target pixel and chrominance data of the plurality of peripheral pixels;
   the judgment unit compares the luminance data difference value to a luminance data threshold value and compares the chrominance data difference value to a chrominance data threshold value; and
   the selection unit selects the chrominance data of the peripheral pixel when the luminance data difference value is less than the luminance data threshold value and the chrominance data difference value is less than the chrominance data threshold value and selects the chrominance data of the target pixel when the luminance data difference value is greater than the luminance data threshold value.

8. An image processing method comprising:
   storing a retrieved image in a memory, wherein the image is written on a plurality of rows of a two dimensional storage area of the memory; and
   performing a filtering process with respect to each pixel data on a row when the image is written on the plurality of rows of the two-dimensional storage area of the memory, wherein the pixel data on the row is pixel data on a row of the two-dimensional storage area;
   comparing pixel data of a target pixel included in the pixel data on the row to each of pixel data of a plurality of peripheral pixels, which neighbors the target pixel, and outputs post-compprison pixel data;
   obtaining a difference value between the pixel data of the target pixel and the pixel data of the plurality of peripheral pixels;
   cormparing the difference value to a predetermined value;
   selecting the pixel data of the of the plurality of peripheral pixels when the difference value is less than the predetermined value and select the pixelof the target pixel when the difference value is greater than the predetermined value; and obtaining post-process target pixel data from at least a portion of a plurality of the post-comparison pixel data.

9. A camera comprising:

an image pick-up element; and an image processing circuit performing a filtering process on a at least a portion of a plurality of pixel data retrieved by the image pick-up element, wherein the image processing circuit further comprises a memory for storing an image retrieved from the image pick-up element, wherein the image is written on a plurality of rows of a two dimensional storage area of the memory, and a filtering circuit performing the filtering process with respect to each pixel data on a row when the image is written on the plurality of rows of the two-dimensional storage area of the memory, wherein the pixel data on the row is pixel data on a row of the two-dimensional storage area, wherein the filtering circuit further comprises:

a comparison unit configured to comparing pixel data of a target pixel included in the pixel data on the row to each of pixel data of a plurality of peripheral pixels, which neighbors the target pixel, and outputs post-comparison pixel data, the comparison unit further comprises:

a difference unit configured to obtain a difference value between the pixel data of the target pixel and the pixel data of the plurality of peripheral pixels;

a judgment unit configured to compare the difference value to a predetermined value; and a selection unit configured to select the pixel data of the plurality of peripheral pixels when the difference value, is less than the predetermined value and select the pixel data of the target pixel when the difference value is greater than the predetermined value; and a calculation circuit configured to obtain post-prosses target pixel data from at least a portion of a plurality of the post-comparison pixel data.

* * * * *